(12) United States Patent
Stulberger

(10) Patent No.: US 6,983,170 B2
(45) Date of Patent: Jan. 3, 2006

(54) MOBILE CELLULAR TELEPHONE

(76) Inventor: Jerry Stulberger, 366 Silver Ct., Woodmere, NY (US) 11598

( * ) Notice: Subject to any disclaimer, the term of this patent is extended or adjusted under 35 U.S.C. 154(b) by 576 days.

(21) Appl. No.: 09/969,705

(22) Filed: Oct. 3, 2001

(65) Prior Publication Data

US 2003/0064748 A1 Apr. 3, 2003

(51) Int. Cl.
 *H04Q 7/20* (2006.01)
(52) U.S. Cl. .................. 455/556; 455/343; 455/89; 455/90; 455/569; 455/557; 455/575; 379/58; 379/62; 379/447; 379/354
(58) Field of Classification Search ........... 455/556, 455/343, 89, 90, 569, 557, 404.1–404, 460, 455/88, 345, 575; 179/2; 379/58, 62, 354, 379/430, 446, 454, 447
See application file for complete search history.

(56) References Cited

U.S. PATENT DOCUMENTS

| | | | |
|---|---|---|---|
| 4,455,454 A | | 6/1984 | Umebayashi |
| 4,698,838 A | * | 10/1987 | Ishikawa et al. ......... 455/569.2 |
| 4,847,887 A | * | 7/1989 | Suzuki et al. ............ 455/569.2 |
| 4,850,015 A | | 7/1989 | Martin |
| 4,852,147 A | | 7/1989 | Suzuki et al. |
| 5,086,510 A | | 2/1992 | Guenther et al. |
| 5,319,803 A | | 6/1994 | Allen |
| 5,453,929 A | | 9/1995 | Stove |
| 5,687,234 A | * | 11/1997 | Chang ..................... 379/454 |
| 5,896,565 A | * | 4/1999 | Miller ..................... 455/404.1 |
| 5,967,851 A | * | 10/1999 | Ozer et al. ............... 439/668 |
| 5,991,646 A | | 11/1999 | Frank et al. |
| 6,131,042 A | | 10/2000 | Lee et al. |
| 6,304,764 B1 | * | 10/2001 | Pan ........................ 455/569.2 |
| 6,567,676 B1 | * | 5/2003 | Tsai ....................... 455/569.2 |
| 2002/0068605 A1 | * | 6/2002 | Stanley ................... 455/556 |

FOREIGN PATENT DOCUMENTS

| | | |
|---|---|---|
| DE | 4220016 | 12/1993 |
| DE | 19739626 | 6/1998 |
| GB | 2326560 | 12/1998 |

* cited by examiner

*Primary Examiner*—Temica Beamer
*Assistant Examiner*—Julio Perez
(74) *Attorney, Agent, or Firm*—Michael I Kroll

(57) ABSTRACT

The present invention 10 is a cellular telephone that is releasably attached to the airbag cover 14 of the steering wheel 12 of a vehicle 16. The present invention 10 can be attached by hook and loop material 24 or by a strap means 60. Power to the telephone is supplied by a cord 20 which receives power from the 12-volt cigarette lighter outlet 22. The cord 20 has a breakaway junction 46 disposed so that the cord will break away in the event that the airbag 14 is activated. Positioned between the cellular telephone and the cigarette lighter 22 is a spring-loaded retractor means 18 which will store cord 20 as released as the steering wheel is turned. The present invention 10 also comprises an awaken mode 56 for lethargic users 54 so that a preprogrammed telephone call will be made when the telephone 10 is turned on. Additionally, the present invention 10 comprises means for interfacing 64 with an independent cellular telephone which telephone can be controlled by the present invention 10 by placing the independent cellular telephone in a cradle 66 connected to the present invention 10. Additionally, the present invention 10 comprises multiple breaking points 76 whereby the housing 30 and electronics 78 contained therein will break into multiple pieces when the airbag 72 deploys.

21 Claims, 19 Drawing Sheets

MOBILE CELLULAR TELEPHONE

BACKGROUND OF THE INVENTION

1. Field of the Invention

The present invention relates generally to mobile telephones and, more specifically, to a cellular telephone that can be releasably attached to a steering wheel by fasteners and having oversized buttons with a display window and an automatic calling function on a timer that functions to awaken the driver. The objective of the present invention is to be a government approved "safe" phone or phone interface for use in automobiles. The phone can be manufactured as a stand-alone self-contained phone or can be an interface to an existing phone.

2. Description of the Prior Art

There are other telephone device designed for vehicle steering wheels. Typical of these is U.S. Pat. No. 4,455,454 issued to Umebayashi on Jun. 19, 1984.

Another patent was issued to Ishikawa et al. on Oct. 6, 1987 as U.S. Pat. No. 4,698,838. Yet another U.S. Pat. No. 4,850,015 was issued to Martin on Jul. 18, 1989 and still yet another was issued on Jul. 25, 1989 to Suzuki et al. as U.S. Pat. No. 4,852,147.

Another patent was issued to Guenther et al. on Feb. 4, 1992 as U.S. Pat. No. 5,086,510. Yet another U.S. Pat. No. 5,319,803 was issued to Allen on Jun. 7, 1994. Another was issued to Stove on Sep. 26, 1995 as U.S. Pat. No. 5,453,929 and still yet another was issued on Nov. 23, 1999 to Frank et al. as U.S. Pat. No. 5,991,646.

Another patent was issued to Lee et al. on Oct. 10, 2000 as U.S. Pat. No. 6,131,042. Yet another Deutschland Patent No. DE 19 739 626 was issued to Weilbacher on Jun. 10, 1998. Another was issued to Wardyn on Dec. 23, 1993 as Deutschland Patent No. DE 4 220 016 and still yet another was issued on Oct. 8, 1998 to Birch as U.K. Patent No. GB 2 326 560.

U.S. Pat. No. 4,455,454

Inventor: Kazuyuki Umebayashi

Issued: Jun. 19, 1984

Branch telephone connection control signal communication between a dialing control board mounted on a steering wheel but held in a stationary state irrespective of a rotation of the steering wheel and an electric controller disposed at a position remote from a steering mechanism, the electric controller is connected to a mobile telephony device on a road-vehicle. The dialing control board is supported by a steering drive shaft through a toothed wheel mechanism, so that it remains stationary regardless of a rotation of the shaft. The control board and the electric controller are electrically coupled to each other through a combination of slip rings and brushes. The dialing control board and the electric controller each include an FSK modulation circuit, an FSK demodulation circuit and a microprocessor for controlling transmission or reception of the electric signals. Key inputs on the dialing control board are encoded by the dialing control board and then transmitted to the electrical controller. The electric controller decodes the received code and then renders operation instructions to the mobile telephony device. A microphone for driver's speaking is equipped on a front panel and connected to the mobile telephony device. In another embodiment, the microphone is equipped on the dialing control board and connected to the mobile telephony device through an electric-magnetic coupling of a pair of electric coils.

U.S. Pat. No. 4,698,838

Inventor: Massanobu Ishikawa

Issued: Oct. 6, 1987

A steering wheel having a telephone includes a pad portion secured to a steering shaft, wherein the pad portion comprises a base held on the steering shaft and a telephone detachably held on the base, the base has a receiving recess and a swing projection with which the telephone is engaged, and the telephone has an engaging recess in engagement with the swing projection and a radio communication means for transferring signals. Therefore, the driver can use the telephone of the present invention in his driving attitude without picking up it during operation of the steering wheel and other occupants can also pick up it from the steering wheel.

U.S. Pat. No. 4,850,015

Inventor: Gary Martin

Issued: Jul. 18, 1989

A vehicular steering wheel telephone apparatus is set forth wherein a centrally mounted telephone unit is positioned medially of a vehicle-type steering wheel. Positioned in overlying relationship to said telephone unit is a pair of voice receiving speakers. In underlying relationship to said telephone unit is a pair of voice transmitting microphones. An overlying pivotal closure releases the telephone for use by releasing a switch hook exposing the telephone unit for operation. Optionally, a switching means is available for switching the receiving speakers for utilization with automobile stereo speakers.

U.S. Pat. No. 4,852,147

Inventor: Katsuo Suzuki et al.

Issued: Jul. 25, 1989

A telephone apparatus has a telephone set including a wireless handset, a wireless transmitter, a wireless receiver, a signal identifying circuit for discriminating received signals to generate or erase power-on signals, a telephone set power supply circuit having a secondary battery cluster and switch circuits for applying the voltage of the secondary battery cluster to the above-described elements during a predetermined period, a power supply terminal connected to the secondary battery cluster, and a telephone set power supply controlling circuit; a main power supply; a power supply switch; a connection switching circuit for selectively connecting the power supply terminal to the power supply switch or a predetermined load; and a telephone power supply control instructing circuit responsive to the closing of the power supply switch for operating the connection switching circuit to form a connection between the power supply terminal and the predetermined load to transmit a first signal, subsequently operating the connection switching circuit to form a connection between the power supply terminal and the power supply switch to transmit a second signal in response to the opening of the power supply switch.

U.S. Pat. No. 5,086,510

Inventor: Clemens Guenther et al.

Issued: Feb. 4, 1992

A visual display monitor of an information system of a motor vehicle is connected not only with the usual engine and vehicle instrumentation, but also with a variety of electrical equipment installed in the motor vehicle which the driver may want to activate and control from time to time. The picture screen of the monitor, preferably of the LCD, electro-luminescence or plasma type, is subdivided into a report region at the top and a region for interactive information such as instructions menus and operation results. All the functions that would otherwise be performed by individual buttons, knobs and switches of the various equipment installed in the vehicle may be simply performed by a series of easily designated choices. One input device has a ball control for directing a cursor on the screen of the monitor, a menu button and an entry button, and may be located on the steering wheel. While a particular equipment that has been selected is being controlled, the corresponding field of the monitor selected by the cursor has its light-to-dark contrast reversed, to indicate that the corresponding equipment is in the process of being adjusted or controlled. Another input device is combined with a telephone handset used for telephone calls and has a recessed alphanumeric keyboard in its back for more detailed entries into the system. The information system is built around a digital speech memory which not only provides telephone answering messages and the like but also makes possible audible outputs of the system through the radio receiver's loudspeaker so that the driver can be less dependent on visual outputs displayed on the monitor.

U.S. Pat. No. 5,319,803

Inventor: Dillis V. Allen

Issued: Jun. 7, 1994

A telephone keyboard and display assembly for a vehicle steering wheel assembly designed to be mounted generally radially downwardly between a steering wheel base and the hand grip ring. The telephone is sufficiently narrow so the operator's fingers may freely pass around the handgrip ring on either side and the phone is tilted slightly upwardly to improve the operator's vision of the keyboard and display. The upper end of the telephone is supported on the base and its lower end attaches to the handgrip ring.

U.S. Pat. No. 5,453,929

Inventor: Andrew G. Stove

Issued: Sep. 26, 1995

A vehicle control device such as a steering wheel is equipped with a number of sensors for sensing physiological variations in the human vehicle operator. These sensors are coupled to a master unit (not shown). A rise in the anxiety level of the human operator, which may be due to an impending maneuver, is detected by the master unit via, for example, a rise in skin conductivity, and a signal is provided to other in-vehicle equipment. This signal may be used to delay the provision of non-critical information to the operator, such as navigational data, fuel consumption details or the ringing of a car-telephone.

U.S. Pat. No. 5,991,646

Inventor: Christopher L. Frank et al.

Issued: Nov. 23, 1999

A speaker and microphone are provided on and supported by an articulating extension. The extension comprises a cigarette lighter adapter which is plugged into a cigarette lighter to provide power for the speaker and microphone. The speaker and microphone are connected to a wireless telephone such that the speaker and microphone can be used to place a call with the telephone in a hands free manner. The extension articulates to optimally orient the speaker and microphone with respect to the user.

U.S. Pat. No. 6,131,042

Inventor: Chang Lee et al.

Issued: Oct. 10, 2000

A combination cellular telephone and radio receiver/tape player/recorder for vehicles includes a cellular telephone circuit and an AM/FM radio receiver including an antenna and loudspeaker. The cellular telephone is wired to the radio receiver for receiving and sending cellular telephone transmissions through the radio antenna and playing telephone messages through the loudspeaker. A dialing keypad is mounted on an armrest beside the driver's seat. The keypad includes a cover and a motor operatively associated with the cover for retracting and replacing the cover so as to enclose the keypad. The tape player/recorder is used to record telephone messages being received or sent by the cellular telephone. An alphanumeric display provided as a component of the basic radio receiver/tape player/recorder is connected to display telephone numbers being called out or called in. A cellular telephone handset with the same telephone number allows passengers in other parts of the vehicle to talk on the telephone.

Deutschland Patent Number DE 19 739 626

Inventor: Weilbacher Dieter

Issued: Jun. 10, 1998

The steering wheel has a number of press tab type switches (6 to 15) positioned on the inside edges of the steering wheel allowing the driver to turn the wheel without the hindrance and to operate the switches by finger/thumb pressure. Three switches are positioned on the top edge of the central spoke assembly and on the inside of the wheel rim on each side of the steering wheel. Two more switches each side are on the inside of the steering wheel under the central spoke assembly. For some of the switches an indicator panel can be fitted into the spoke assembly. This provides an illuminated display of the switch settings e.g., the transmission settings. Another indicator can be a telephone number, selected from a memory, for a mobile phone. The switches are recessed into their mountings and are covered with the outer covering layer of the steering wheel trim.

Deutschland Patent Number DE 4 220 016

Inventor: Wardyn Miroslaw

Issued: Dec. 23, 1993

The vehicle telephone has a central portion (2) of a steering wheel partially domed (5) to serve as a housing for a loudspeaker (21) and a microphone (23) which springs into its operative position when a catch (24) is released. Parallel rows (6–8) of keys (e.g. 9–11) intersect the longitudinal axis of the vehicle at right angles during straight travel. Special keys (12–17) which may be of distinctive shapes are located within reach of the driver's right thumb. Pulses are transmitted to corresponding parts of the installation via wiring and slip contacts, or electronically, to allow of steering. Advantage—Use of keypad involves less distraction from driving, even during negotiation of curves, when visibility in direction of travel is not impaired.

U.K. Patent Number GB 2 326 560

Inventor: Brian Lawrence Birch

Issued: Dec. 23, 1998

A car phone for use by a motorist, which phone is characterized in that the handset is integrally formed or assembled with or adapted to be mounted to a steering wheel for a motor cycle.

While these telephones may be suitable for the purposes for which they were designed, they would not be as suitable for the purposes of the present invention, as hereinafter described.

SUMMARY OF THE PRESENT INVENTION

The present invention is a cellular telephone that is releasably attached to the airbag cover of the steering wheel of a vehicle. The present invention can be attached by hook and loop material or by a strap means. Power to the telephone is supplied by a cord which receives power from the 12-volt cigarette lighter outlet. The cord has a breakaway junction disposed so that the cord will break away in the event that the airbag is activated. Positioned between the cellular telephone and the cigarette lighter is a spring-loaded retractor means which will store cord to be released as the steering wheel is turned. The present invention also comprises an awaken mode for lethargic users so that a preprogrammed telephone call will be made when the present invention is turned on. Additionally, the present invention comprises means for interfacing with an independent cellular telephone which telephone can be controlled by the present invention by placing the independent cellular telephone in a cradle connected to the present invention. Additionally, the present invention comprises multiple breaking points whereby the housing and electronics contained therein will break into multiple pieces when the airbag deploys.

By way of further explanation, the present invention is a cellular telephone that can be releasably attached to a steering wheel by fasteners. The fasteners can be attached to the center console of the steering wheel by hook and loop material whereby a first mating member is fastened to the center console of the steering wheel and a second mating member is fixed to the rear exterior wall of the telephone housing.

In addition the telephone can be releasably attached to the center console of the steering wheel by fasteners in the form of straps with hook-like attachment fixed to each strap distal end. The straps are looped with a buckle whereby the length can be adjusted. The hook-like elements are attached to the edge of the airbag package.

The power for the telephone is supplied from an electrical connection to the vehicles cigarette lighter. The electrical connection is in the form of a wire having appropriate connectors on each distal end and a breakaway junction. A first connector attaches to the telephone and a second connector attaches to the cigarette lighter socket.

Positioned between said connectors and attached to the vehicle dashboard is a spring load wire storage dispenser which tensions the wire extending to the steering column. The steering column wire is releasably attached to the rear of the steering wheel center console. As the steering wheel is turned the spring load wire storage dispenser releases wire and recoils wire according to the tensioning member.

The telephone has an enlarged face with an oversized constantly lighted number pad and function keys. Positioned over the number pad and extending substantially the width of the number pad is a display window having a microphone spaced away on one side and a speaker spaced away on the other side of the display window. Positioned on each side of the number pad are oversized recording buttons whereby a user pressing upon either key can record a message. The recording session can take place while a telephone conversation is in progress.

Also located on the face of the telephone is a power switch. When power is terminated to the telephone the notepad is erased.

The telephone also has an awaken function. The user can preprogram a telephone number or enter a telephone number upon powering on the telephone. When the phone power is energized an internal timer is engaged. When the time has expired the telephone will place the call to the entered number unless the timer sequence is reset. The process continues until the vehicle ignition is turned off. The timer is preprogrammed to place the call in about 30 minutes. If the call is initiated the calling sequence volume is increased in amplitude so that a driver in a drowsy state will be awakened. When the calling sequence is completed the driver can easily reduce the volume to normal levels by hitting and holding down any key and the driver can engage in a conversation with the called party to achieve a focused and awake condition. Upon termination of the call the timer sequence is reset. This process continues until the phone power is turned off.

An additional element is provided in the form of an interface device where an existing cellular telephone can be placed into the interface cradle which disables the existing cellular telephone and transfers some of the functions to the cellular telephone of the present invention. The cellular telephone of the present invention will answer all calls from the existing cellular telephone as well as provide access to the stored numbers with the existing cellular telephone.

A primary object of the present invention is to provide a cellular telephone that attaches to the center console of the steering wheel.

Another object of the present invention is to provide a cellular telephone that attaches to the center console of the steering wheel using straps as retaining means.

Another object of the present invention is to provide a cellular telephone that is a government approved "safe" phone or phone interface for use in automobiles. The phone can be manufactured as a stand-alone self-contained phone or can be an interface to an existing phone.

Yet another object of the present invention is to provide a cellular telephone that attaches to the center console of the steering wheel having a first mating hook and loop material on the back of the telephone and a second mating hook and loop material attached to the center console of the steering wheel.

Still yet another object of the present invention is to provide a cellular telephone that attaches to the center console of the steering wheel having a power supply cord connected to the cigarette lighter outlet, as well as its own rechargeable battery.

Another object of the present invention is to provide a cellular telephone that attaches to the center console of the steering wheel having a power supply cord that is fixedly positioned to the dash board.

Yet another object of the present invention is to provide a cellular telephone that attaches to the center console of the steering wheel having a power supply cord that is fixedly positioned to the dash board and having a spring load wire storage dispenser.

Still yet another object of the present invention is to provide a cellular telephone that attaches to the center console of the steering wheel having an enlarged number pad and function keys, constantly lighted.

Another object of the present invention is to provide a cellular telephone that attaches to the center console of the steering wheel having a display window.

Yet another object of the present invention is to provide a cellular telephone that attaches to the center console of the steering wheel having independently functioning microphone and speaker for optimum clarity and no conversation cut-offs.

Still yet another object of the present invention is to provide a cellular telephone that attaches to the center console of the steering wheel with a display window having oversized recording buttons whereby a user pressing upon either key can record a message. The recording session can take place while a telephone conversation is in progress.

Another object of the present invention is to provide a cellular telephone that attaches to the center console of the steering wheel having means for entering a telephone number to be used for the awaken feature.

Yet another object of the present invention is to provide a cellular telephone that attaches to the center console of the steering wheel having a preprogrammed timer calling function.

Still yet object of the present invention is to provide a cellular telephone that attaches to the center console of the steering wheel that will automatically call a designated number upon expiration of the timing function.

Another object of the present invention is to provide a cellular telephone that attaches to the center console of the steering wheel having a preprogrammed timer calling function that can be selectively reset before the call is completed.

Yet another object of the present invention is to provide a cellular telephone that attaches to the center console of the steering wheel having a preprogrammed timer calling function that is engaged when the phone is powered up.

Still yet another object of the present invention is to provide a cellular telephone that attaches to the center console of the steering wheel that is easy to use, easy to read without any extended period looking away from the road. As easy to use as any car manufactured steering wheel feature installed such as cruise control and radio control.

Another object of the present invention is to provide a cellular telephone that attaches to the center console of the steering wheel that can be removed and used elsewhere.

Additional objects of the present invention will appear as the description proceeds.

The present invention overcomes the shortcomings of the prior art by providing a cellular phone that can be manufactured as a stand alone self contained phone or can be an interface to an existing phone. The cellular telephone can be releasably attached to a steering wheel center console by fasteners. The fasteners can be in the form of straps having hook and loop material at each distal end or mating hook and loop material attached to the telephone and steering wheel console respectively.

The power for the telephone is supplied from an electrical connection to the vehicles cigarette lighter socket or a rechargeable battery for outside use.

The spring load wire storage dispenser which tensions the wire extending to the steering column is releasably attached to the rear of the steering wheel center console. As the steering wheel is turned the spring load wire storage dispenser releases wire and recoils wire according to the tensioning member.

The telephone has an enlarged face with an oversized number pad and function keys. Positioned over the number pad is a display window having a microphone and a speaker positioned on each side working independently of each other. Positioned on each side of the number pad are oversized notepad buttons. The first notepad button scrolls through the alphabet while the other scrolls through numbers. When a desired number or letter is displayed a function key is depressed. This sequence continues until the desired message is displayed on the display window.

Also located on the face of the telephone is a power switch. When power is terminated to the telephone the notepad is erased.

The telephone also has an awaken function. The user can preprogram a telephone number that will be stored and used by the phone until changed or enter a telephone number upon powering on the telephone. When the phone is powered on an internal timer is engaged. When the time has expired the telephone will place the call to the entered number unless the timer sequence is intentionally reset and this can only be done during the time the automatic call is in progress. The process continues until the vehicle ignition is turned off. The timer is preprogrammed to place the call in about 30 minutes. If the call is initiated the calling sequence volume is increased in amplitude so that a driver in a drowsy state will be awakened first by the amplified dialing or by the ringing or by the answering sequence initiated on said number such as voice mail, intended party answering, or hello greetings. When the calling sequence is completed the volume can only be reduced to normal levels by the driver hitting any key once and the driver can engage in a conversation with the called party to achieve a focused and awake condition or at least be awakened by the ringing sound, busy signal, voice mail, etc. Upon termination of the call the timer sequence is automatically (passively) reset. However, at that point, you can change the phone number you wish to have called on the next sequence. The phone will allow 60 seconds for this function before going back to the same number. This process continues until the ignition is turned off.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
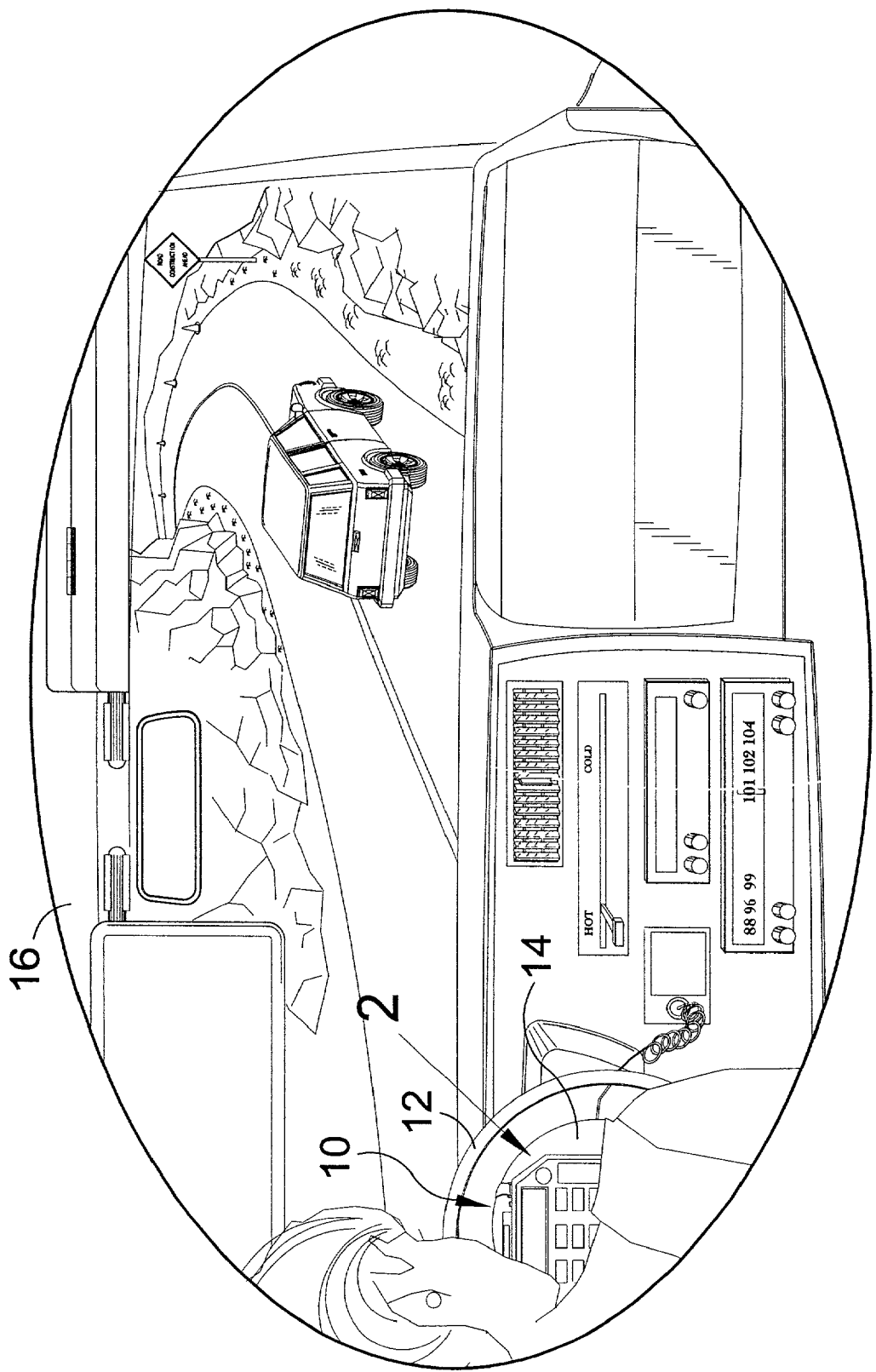
FIG. 1 is an illustrative view of the present invention.

With regard to reference numerals used, the following numbering is used throughout the drawings.

10 present invention
12 steering wheel
14 airbag cover
16 vehicle
18 retractor
20 cord
22 12 volt light plug port
23 12-volt plug
24 hook and loop material
26 steering column
28 coil cord
30 housing
32 battery compartment
34 headpiece port
36 key pad
38 display
40 speaker
42 power key
44 recharging port
46 wire junction
48 microphone
50 speaker
52 awaken mode set
54 user
56 activated awaken mode
58 strap means
60 hook means
62 adjustment means
64 interface device
66 cradle
68 notepad buttons
70 plastic tubing
72 airbag
74 sections of cellular phone
76 approximate breaking points
78 broken electronics
80 factory installed power outlets
82 internal connections
84 existing phone

DETAILED DESCRIPTION OF THE PREFERRED EMBODIMENT

In order that the invention may be more fully understood, it will now be described, by way of example, with reference to the accompanying drawings in which FIGS. 1 through 19 illustrate the present invention wherein an improved mobile cellular telephone for use by a motorist is disclosed.

Turning to FIG. 1, shown therein is an illustrative view of the present invention 10. The cellular phone of the present invention 10 attaches onto the steering wheel 12 airbag cover 14 of a vehicle 16 by means of mating hook and loop material. Positioned on the rear exterior surface of the phone 10 are lengths of hook and loop material. Positioned on the steering wheel airbag cover 14 are mating lengths of hook and loop material. Once positioned the cellular phone 10 provides hands free use of the phone. By way of general explanation, the phone is comprised of a pliable housing that will conform to curved surfaces. It has a microphone and speaker as well as keypad and display window. Additionally, there is an awaken feature that is programmed to have the phone automatically call a previously entered phone number at a predetermined interval. The awaken feature is automatically activated when the phone is powered on passively and can only be deactivated by powering off. The phone call is then automatically made after the programmed elapsed time. The call may be canceled at any time while it is being made. If the driver is experiencing lethargy they can allow the call to be completed which will assist in waking up the driver. Once the call is completed there is a short interval where the driver can enter a new number. Once the interval has passed the awaken feature cycle automatically will begin again unless the user shuts the power of the phone off.

Figure 2:
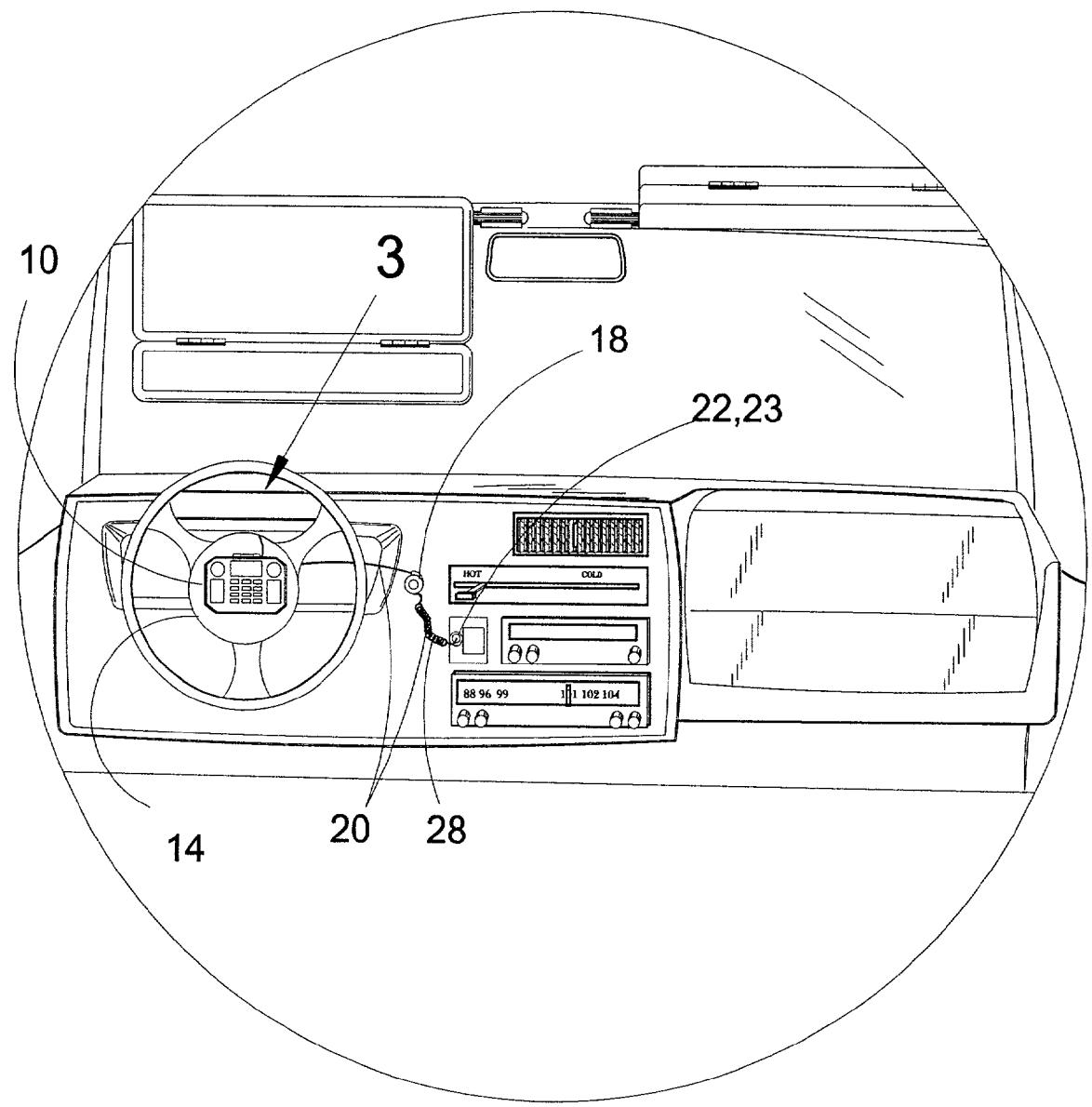
FIG. 2 is frontal view of the present invention mounted to an airbag cover.

Turning to FIG. 2, shown therein is a frontal view of the present invention 10 mounted to an airbag cover 14. The cellular phone of the present invention 10 includes a recharging plug that plugs into a phone jack on the cellular phone at one distal end and runs along the steering wheel column being attached thereto at several points by hook and loop fasteners and thereafter runs to a retractable spring type device 18 that allows the wire 20 to extend or retract as the steering wheel 12 turns. At the other distal end of the retractable spring type device 18, a coil cord 28 and plug 23 is inserted into a 12-volt port or lighter port 22.

Figure 3:
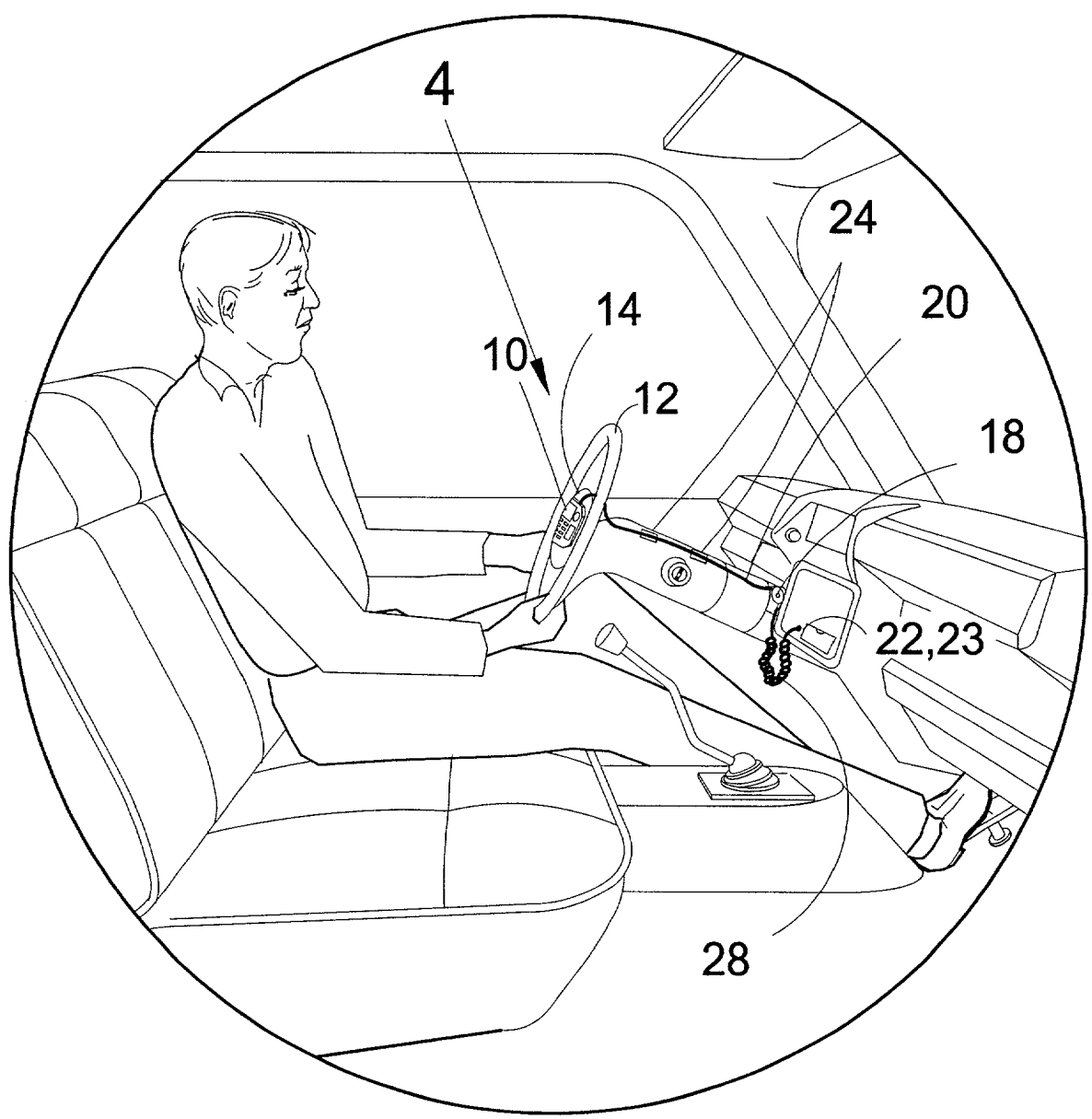
FIG. 3 is a locational illustration of the equipment of the present invention.

Turning to FIG. 3, shown therein is a locational illustration of the equipment of the present invention 10. The advent of the airbag cover 14 on the steering wheel 12 allows for a perfect area to mount the present invention 10. The cellular phone 10 attaches to the steering wheel airbag cover 14 by lengths of hook and loop material fixed on the rear wall of the phone. A recharging plug is plugged into the phone 10 at one end and its wire 20 runs along the steering column 26 being secured at several points by hook and loop strips 24 taped to the steering column 26. It runs to a retractable device 18 that allows the wire 20 to extend or retract as the steering wheel 12 turns. At the distal end of the retractable device, a coil cord 28 and its plug 23 is inserted into a 12-volt port or lighter port 22.

Figure 4:
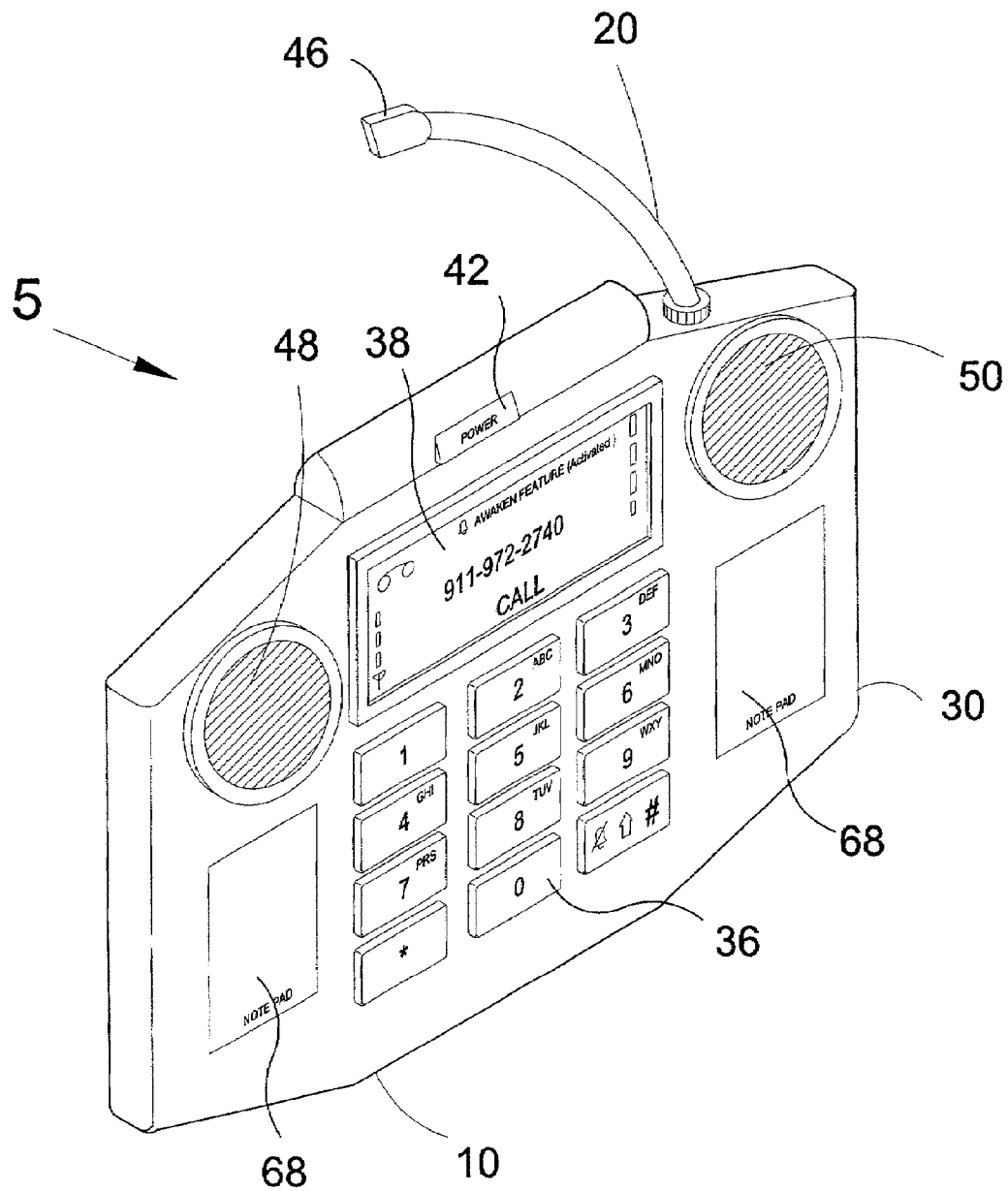
FIG. 4 is a perspective view of the present invention.

Turning to FIG. 4, shown therein is a perspective view of the present invention 10. The cellular phone housing 30 is constructed of a soft pliable material so as to allow for and conform to any slight contour on the airbag covering and for soft impact should the airbag deploy. The phone has a microphone 48 and speaker 50 thereon that work independently and are spaced away from each other to prevent interference. Also shown are on/off power key 42, keypad 36, display window 38 and notepad buttons 68 for recording and playback of recordings. The power supply connection wire 20 uses a friction fit connector 46 and is of sufficient length that should the airbag deploy the phone 10 would disconnect from the power supply.

Figure 5:
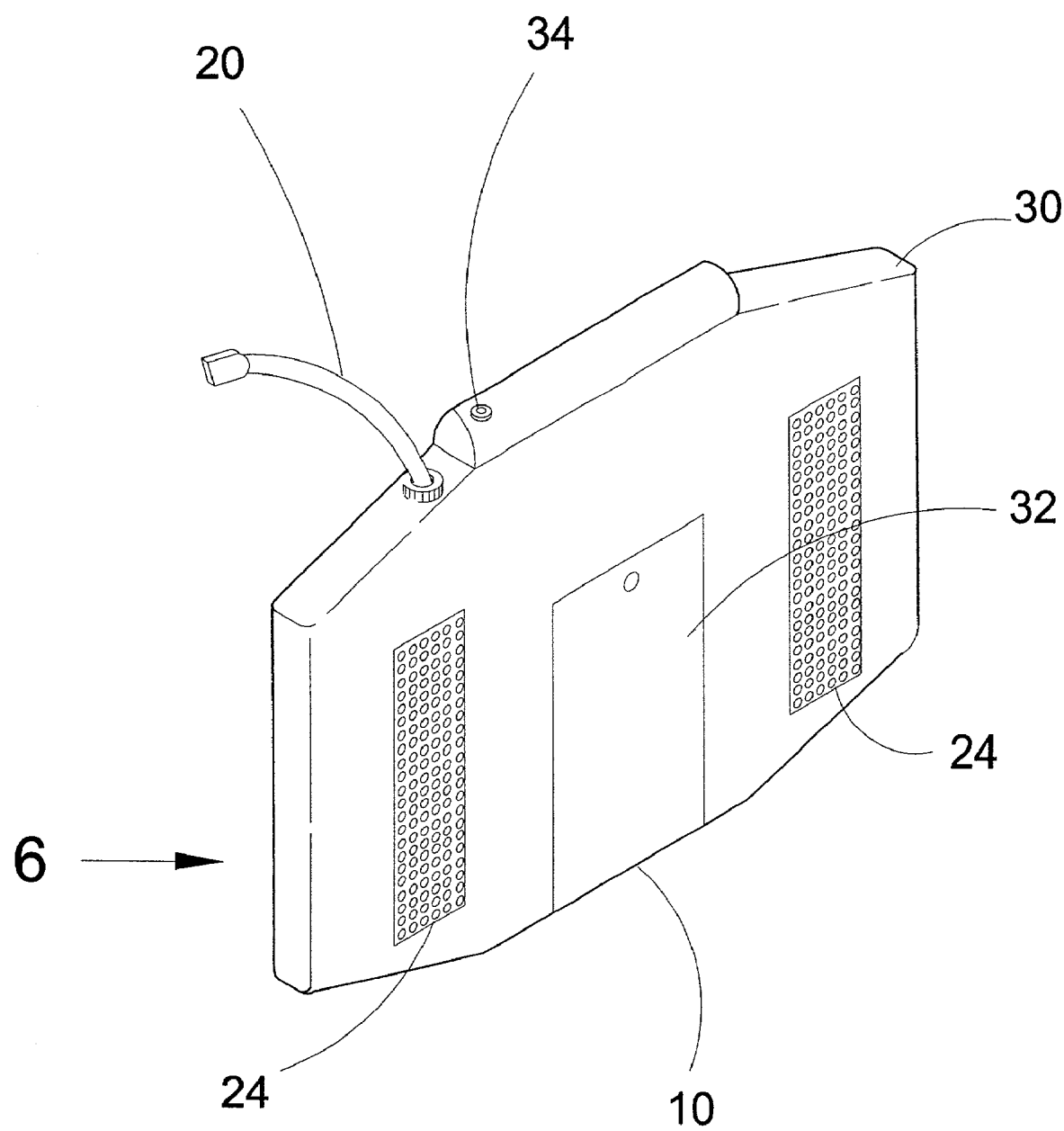
FIG. 5 is a rear perspective view of the present invention.

Turning to FIG. 5, shown therein is a rear perspective view of the present invention 10. Lengths of hook and loop material 24 are attached to the back portion of the cell phone and its mating members are attached to the airbag cover face so the phone 10 can be placed onto the position of attachment. The cellular phone of the present invention 10 has a rechargeable battery and can be recharged in the users vehicle by means of the 12 volt port or can be recharged at home by a standard AC 110-volt wall outlet. Also shown are the housing 30, receptacle wire 20, battery compartment 32, and headpiece port 34.

Figure 6:
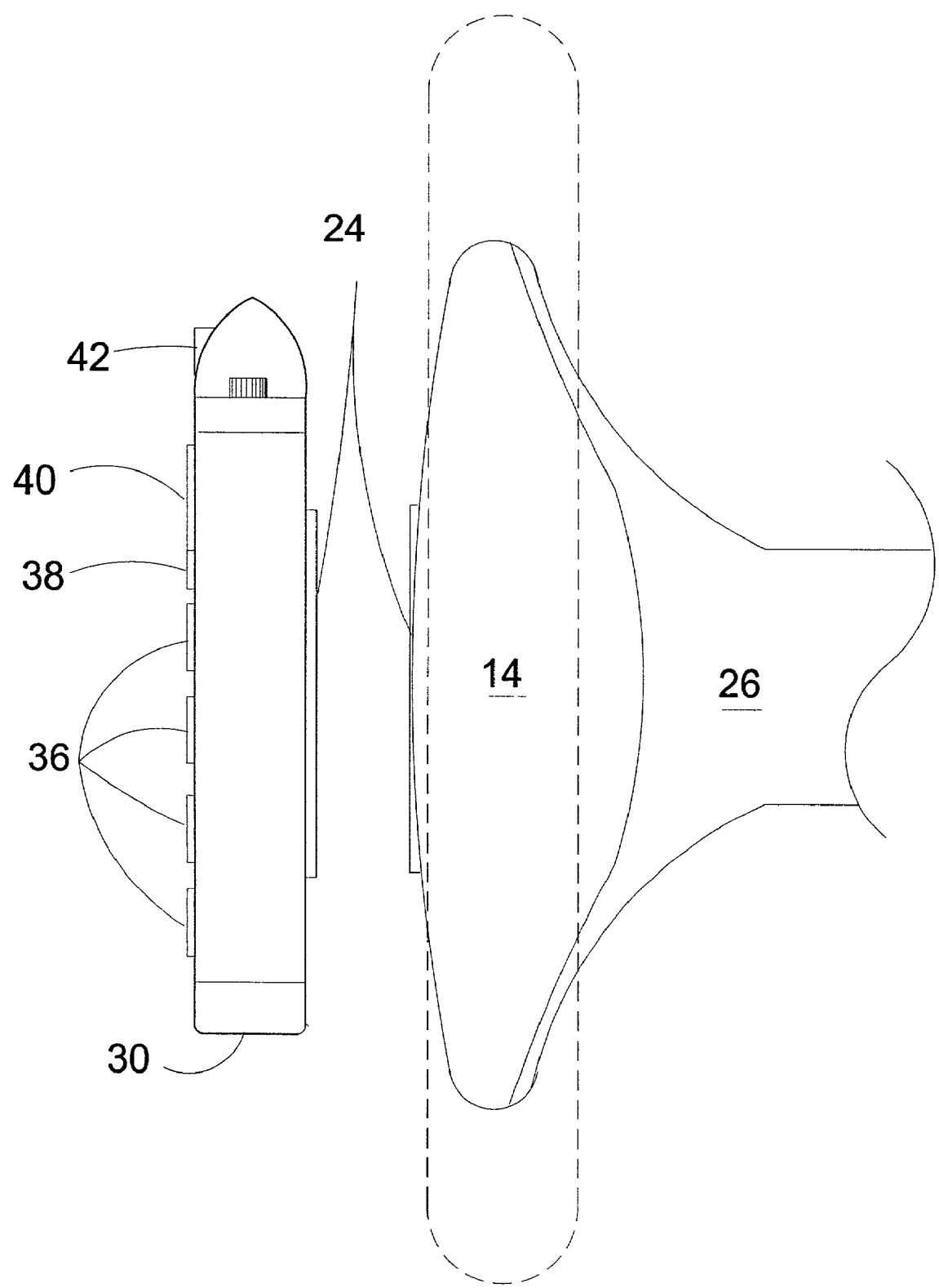
FIG. 6 is a side view of the present invention.

Turning to FIG. 6, shown therein is a side view of the present invention 10. The cellular phone of the present invention 10 is attached to the airbag cover 14 and steering wheel column 26 by joining the mating hook and material 24 members. The phone hook and loop material 24 mate to strips of hook and loop material 24 that are fixed to the airbag cover 14. The pliable body housing 30 construction of the phone provides for some slight contouring of the phone to the airbag cover shape when the phone is attached to its mating members of hook and loop material 24. Also shown are the keypad 36, display 38, speaker 40 and on/off power key 42.

Figure 7:
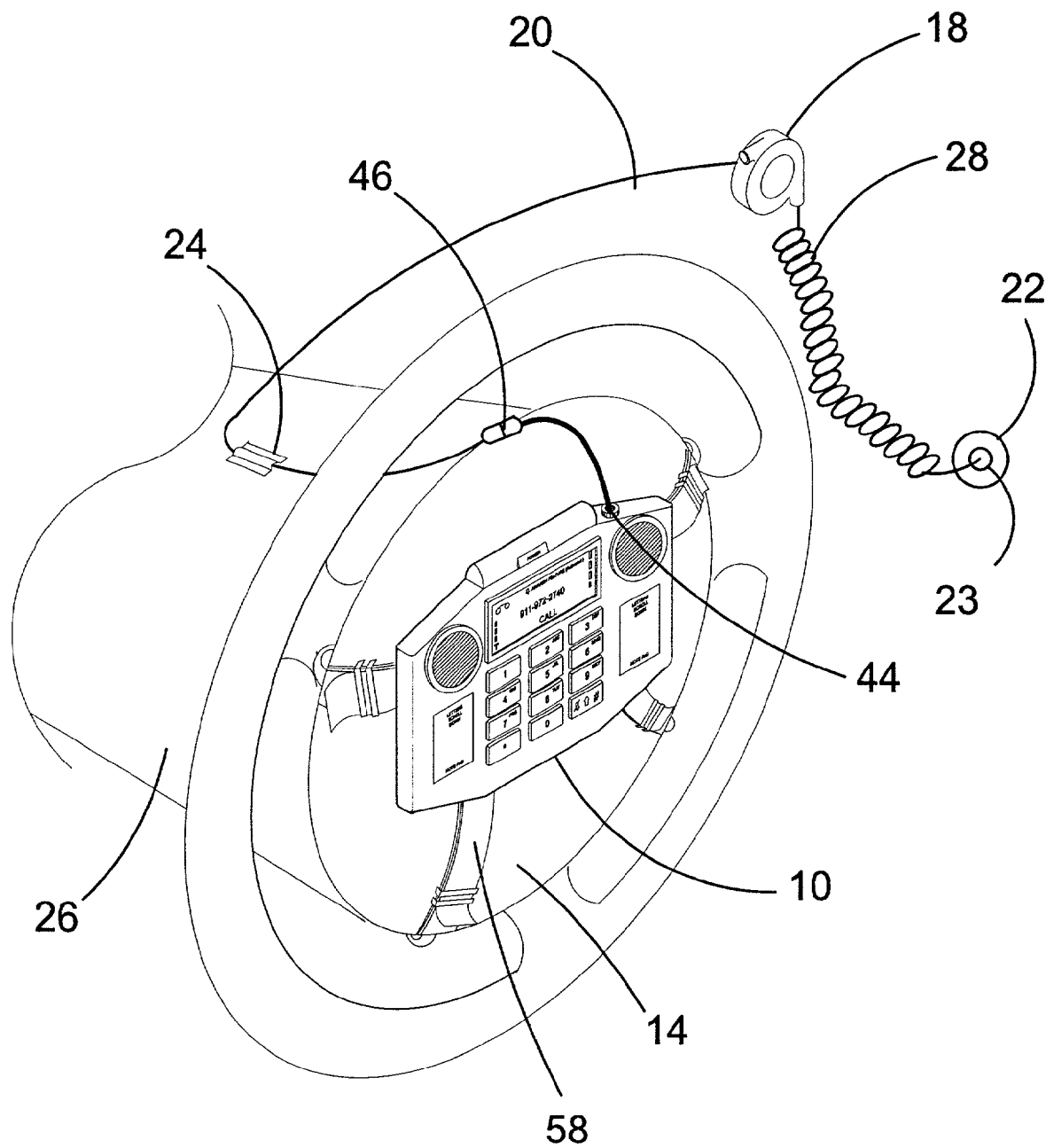
FIG. 7 is an illustrative view of the strap attachment of the cellular phone.

Turning to FIG. 7, shown therein is an illustrative view of the strap attachment means 58 of the cellular phone 10 whereby an additional element is provided for the attachment of the cellular phone. A recharging plug 44 extends from the phone a few inches to a friction connection wire junction 46 providing for easy breakaway in event of airbag deployment. The other part of the connection or recharging wire 20 runs along the steering 26 secured at several points by hook and loop strips 24 attached to the steering column 26 and terminates at a retractable device 18 that allows the wire to extend or retract as the steering wheel turns. At the other distal end of the retractor 18, a coil cord 28 and its plug 23 is inserted in to a 12-volt port or lighter port 22. Airbag cover 14 is also shown.

Figure 8:
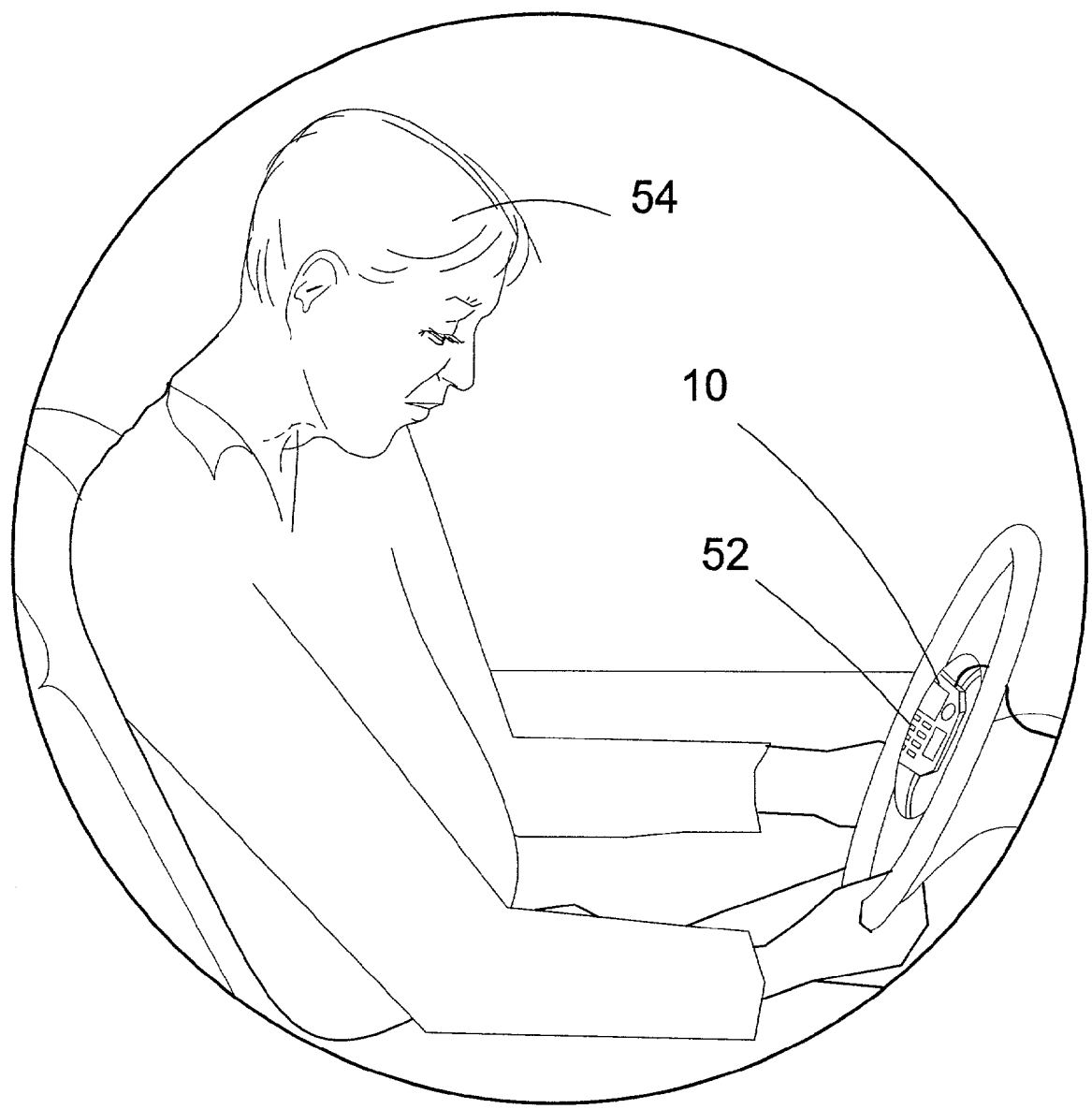
FIG. 8 is an illustrative view of the awaken mode of the present invention.

Turning to FIG. 8, shown therein is an illustrative view of the awaken mode of the present invention 10 for use with a user 54 experiencing dozing or lethargy. The awaken feature is a preprogrammed function whereby the phone 10 automatically calls a previously entered phone number upon expiration of a pre established time period. The awaken mode set feature 52 is automatically activated when the phone is powered on (passively) and can only be deactivated by powering off. The phone call is automatically made after expiration of the time period. The call may be canceled while it is being made. The user will either allow it to continue or press "end" to end the call in its process. This restarts (automatically) the awaken process again, unless the user shuts the power of the phone off.

Figure 9:
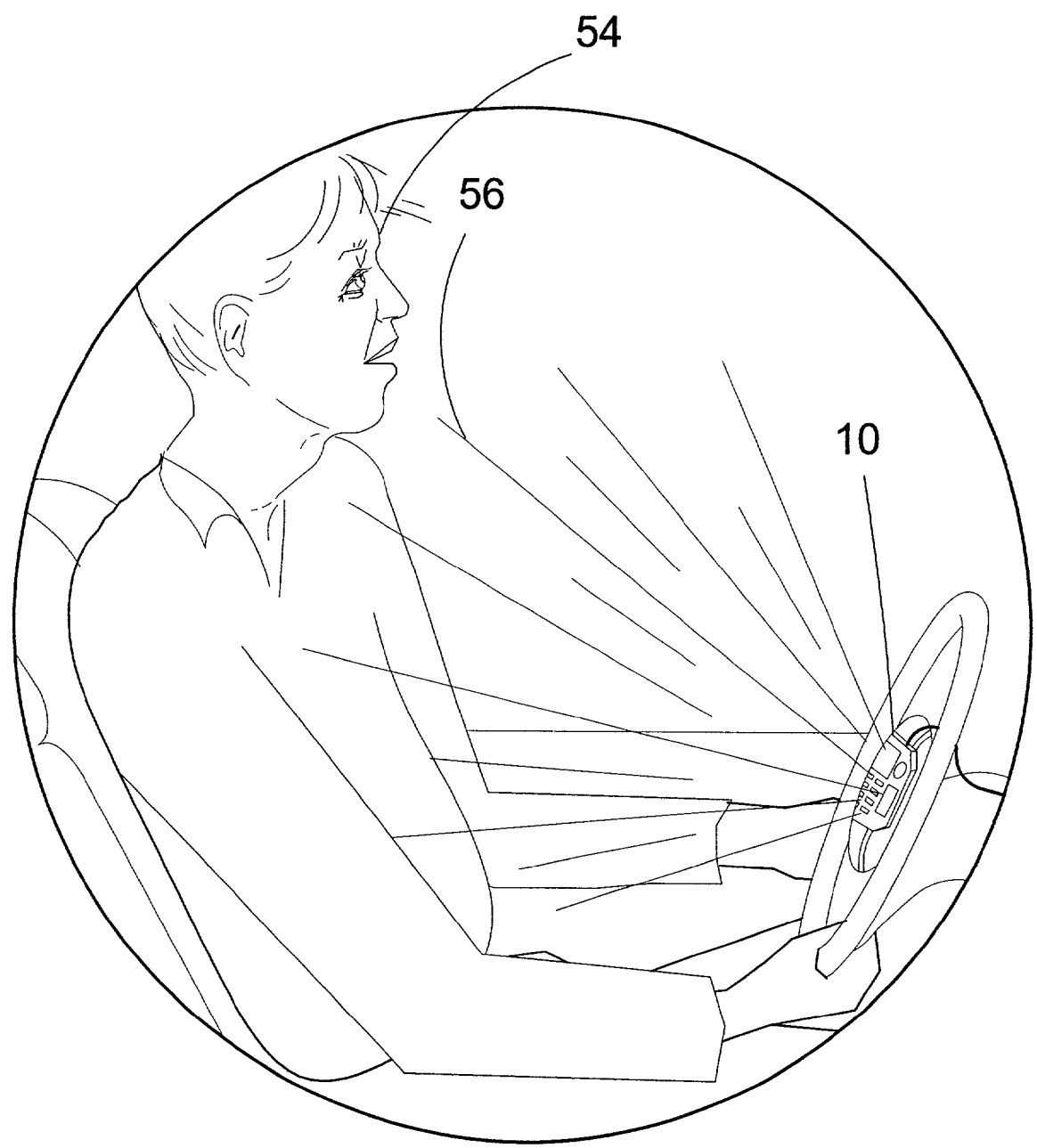
FIG. 9 is an illustrative view of the awaken mode of the present invention.

Turning to FIG. 9, shown therein is an illustrative view of the activated awaken mode 56 of the present invention 10 for use with a lethargic user 54. The awaken feature is a programmed function whereby the phone 10 automatically calls a preset phone number that is entered by the user and at a preset period of time. The awaken feature 56 is automatically activated when the phone is powered on (passively) and can only be deactivated by powering off. The phone call is then automatically made after expiration of the preprogrammed elapsed time. The user can cancel the call while it is being made. The preprogrammed function provides for an elevated volume setting which can be lowered by depressing any key. The sequence of an elevated tone for the establishing a connection, dialing a number, ringing of the number and the remote answering of the number will assist in waking up the driver 54. Once the driver responds they will either allow it to continue or press "end" to end the call in its process. This automatically restarts the awaken process again, unless the user shuts the power of the phone off.

Figure 10:
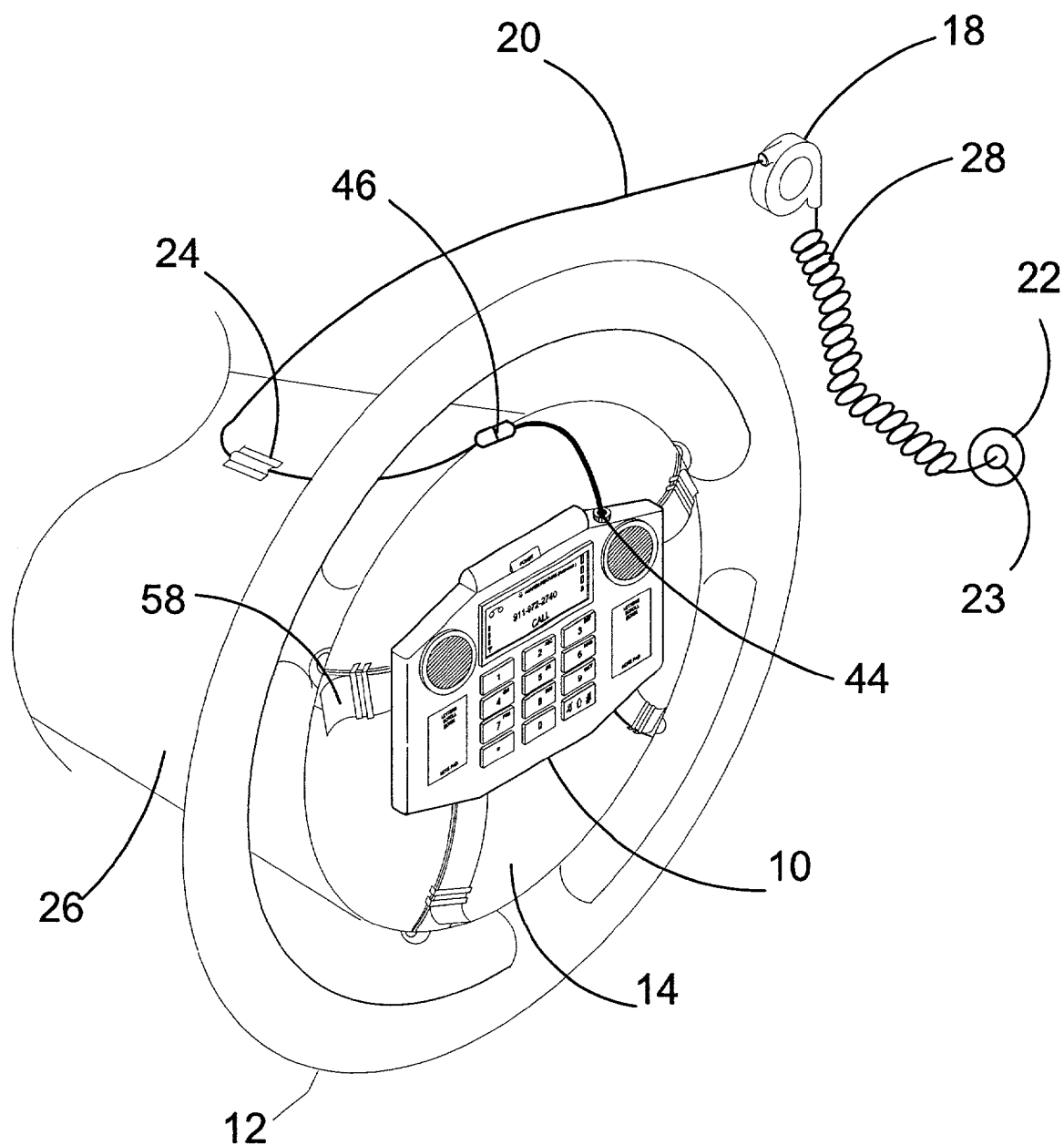
FIG. 10 is an illustrative view of the strap attachment of the cellular phone.

Turning to FIG. 10, shown therein is an illustrative view of the strap attachment means 58 of the cellular phone 10 whereby an additional element is provided for the attachment of the cellular phone. In this embodiment, the cellular phone has a plurality of adjustable straps 58 having a hook-like element (not shown, see FIG. 11) on each strap remote distal end. The hook-like elements are hooked to the back edge of the airbag package 14. The straps 58 are adjusted to provide tensioning between the phone and hook straps. A recharging plug 44 is plugged into the phone extending a few inches to a wire junction 46 providing for easy breakaway in event of airbag deployment. The other part of the junction runs along the steering column 26 secured at several points by hook and loop strips 24 taped to the steering column 26. The wire 20 runs to a retractable device 18 that allows the wire to extend or retract as the steering wheel 12 turns. At the other distal end of the retractor, a coil cord 28 and its plug 23 is inserted into a 12-volt port or lighter port 22.

Figure 11:
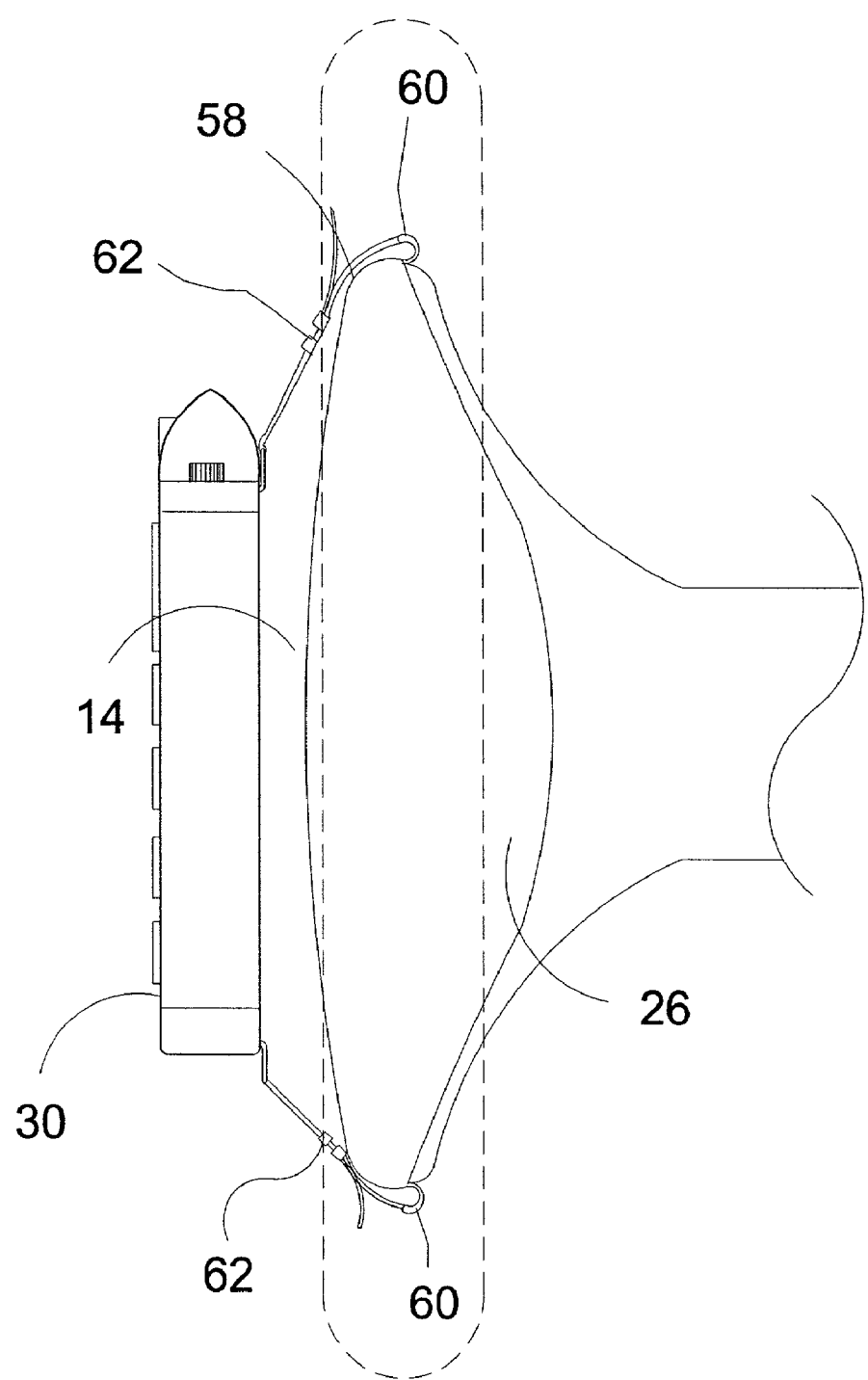
FIG. 11 is an side view of the strap attachment of the present invention.

Turning to FIG. 11, shown therein is a side view of the strap attachment means 58 of the present invention 10 which shows a side view of the additional strap attachment of the cellular phone. The cellular phone has a plurality of adjustable straps 58 having a hook-like element 60 on each strap's remote distal end. The hook-like elements 60 are hooked to the back edge of the airbag package 14. The straps are adjusted by means 62 to provide tensioning between the phone 10 and the hook elements 60. Also shown are the steering column 26 and the soft body phone housing 30.

Figure 12:
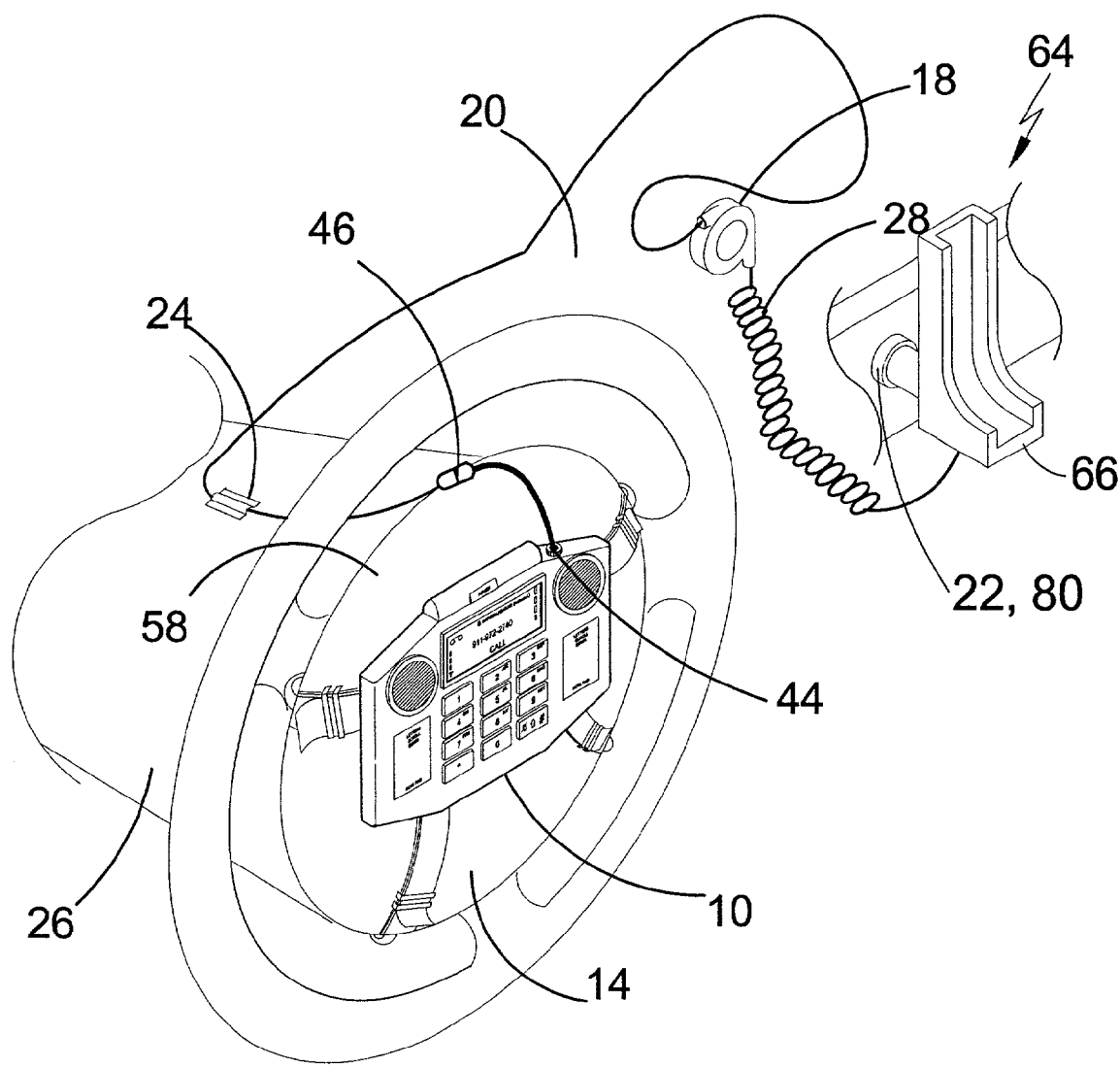
FIG. 12 is an illustrative view of the interface device of the present invention

Turning to FIG. 12, shown therein is an illustrative view of the interface device 64 of the present invention whereby another additional element is provided in the form of an interface device 64 for receiving an independent, previously existing cellular telephones. Existing cellular telephones are placed in the cradle 66 which allows the cellular telephone of the present invention 10 to assume control of the existing cellular telephone. The cellular telephone of the present invention 10 prevents the existing cellular telephone from being used but forwards all of the functions of the existing cellular telephone to the present invention 10. Therefore the cellular telephone of the present invention 10 will answer all incoming calls to the existing cellular telephone in addition to providing access to the stored numbers within the existing cellular telephone whereby calls can be directed to those numbers through the cellular telephone of the present invention 10. Cradle 66 is shown plugged into either a 12 volt plug port 22 or a factory installed power outlet. Other elements previously disclosed are also shown.

Figure 13:
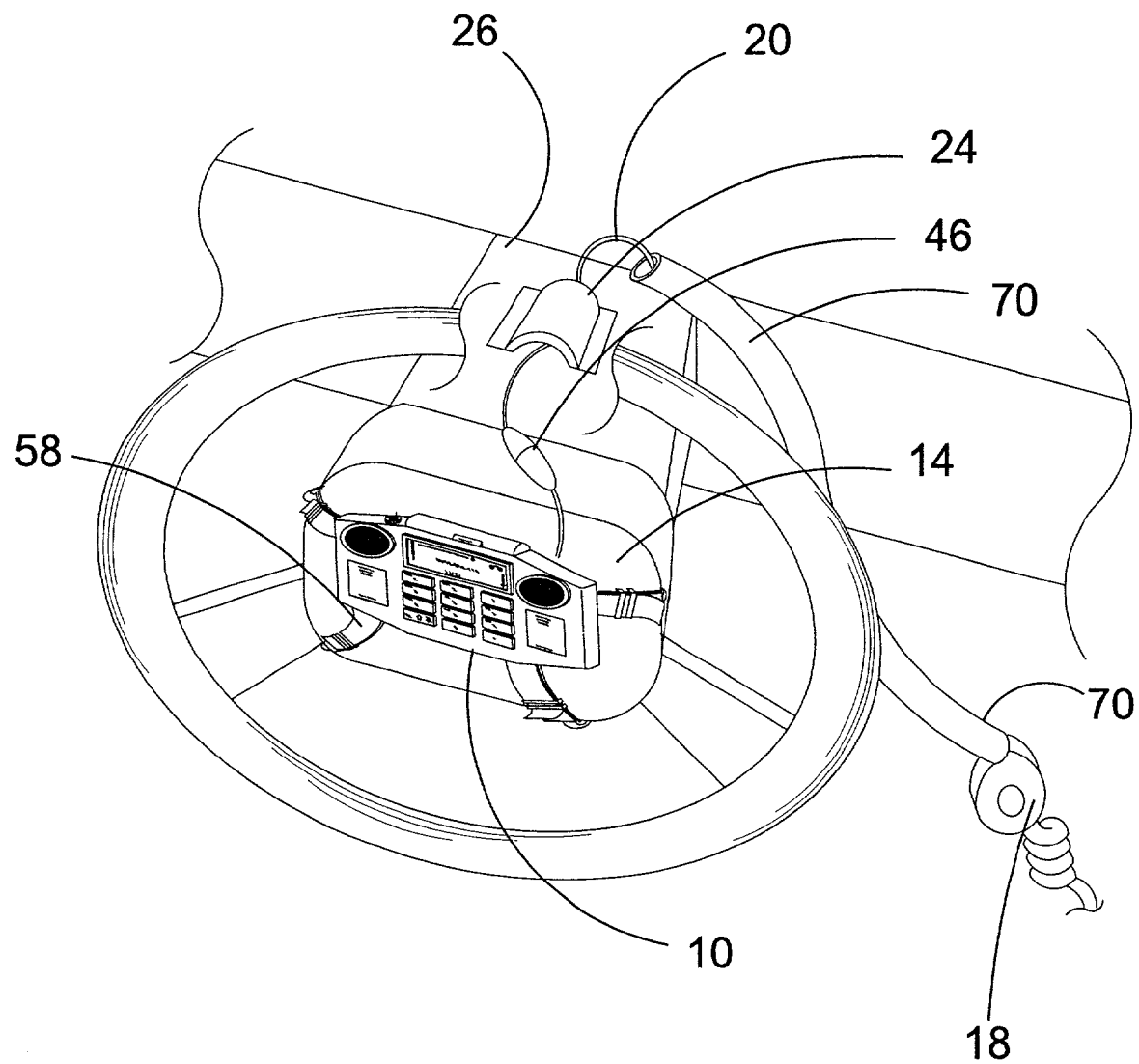
FIG. 13 is a perspective view of the present invention.

Turning to FIG. 13, shown therein is the present invention 10 having a curved, plastic tubing 70 as part of the retractable device 18 to contain the wire 20 to provide protection and direct a straighter path for the wire 20 to reduce driver interference. Other elements previously disclosed are also shown.

Figure 14:
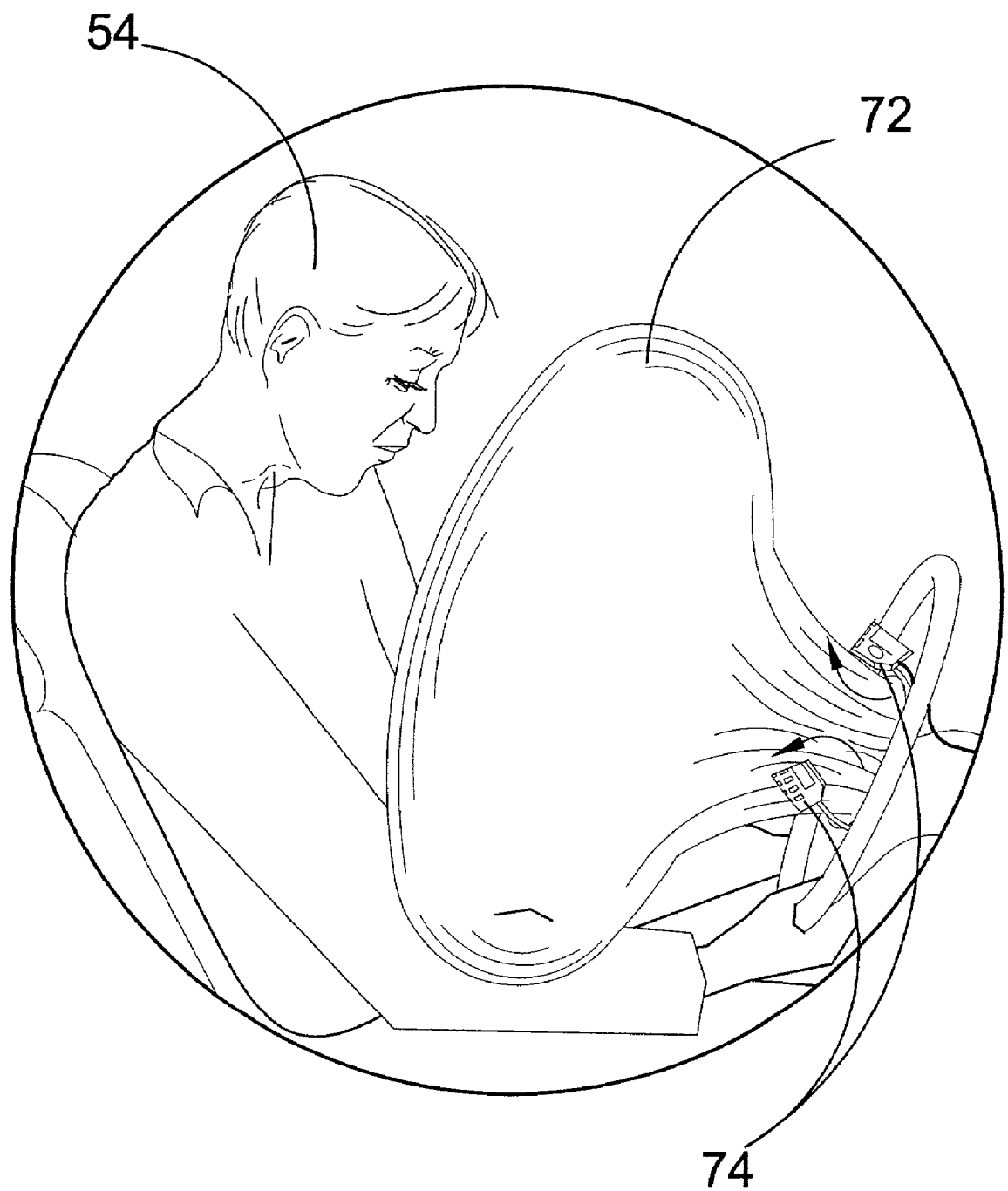
FIG. 14 is an illustrative view of the present invention during air bag deployment.

Turning to FIG. 14, shown therein is the present invention showing the deployment of an airbag 72 wherein the cellular phone structure is designed to break away into a plurality of pieces or sections 74 in tandem and simultaneously with the tearing open of the airbag cover so that all pieces 74 of the phone remain secured by the straps on each piece thereof which straps are clipped to the airbag cover's edges so as not to endanger the driver 54 by becoming a projectile during deployment of the airbag 12.

Figure 15:
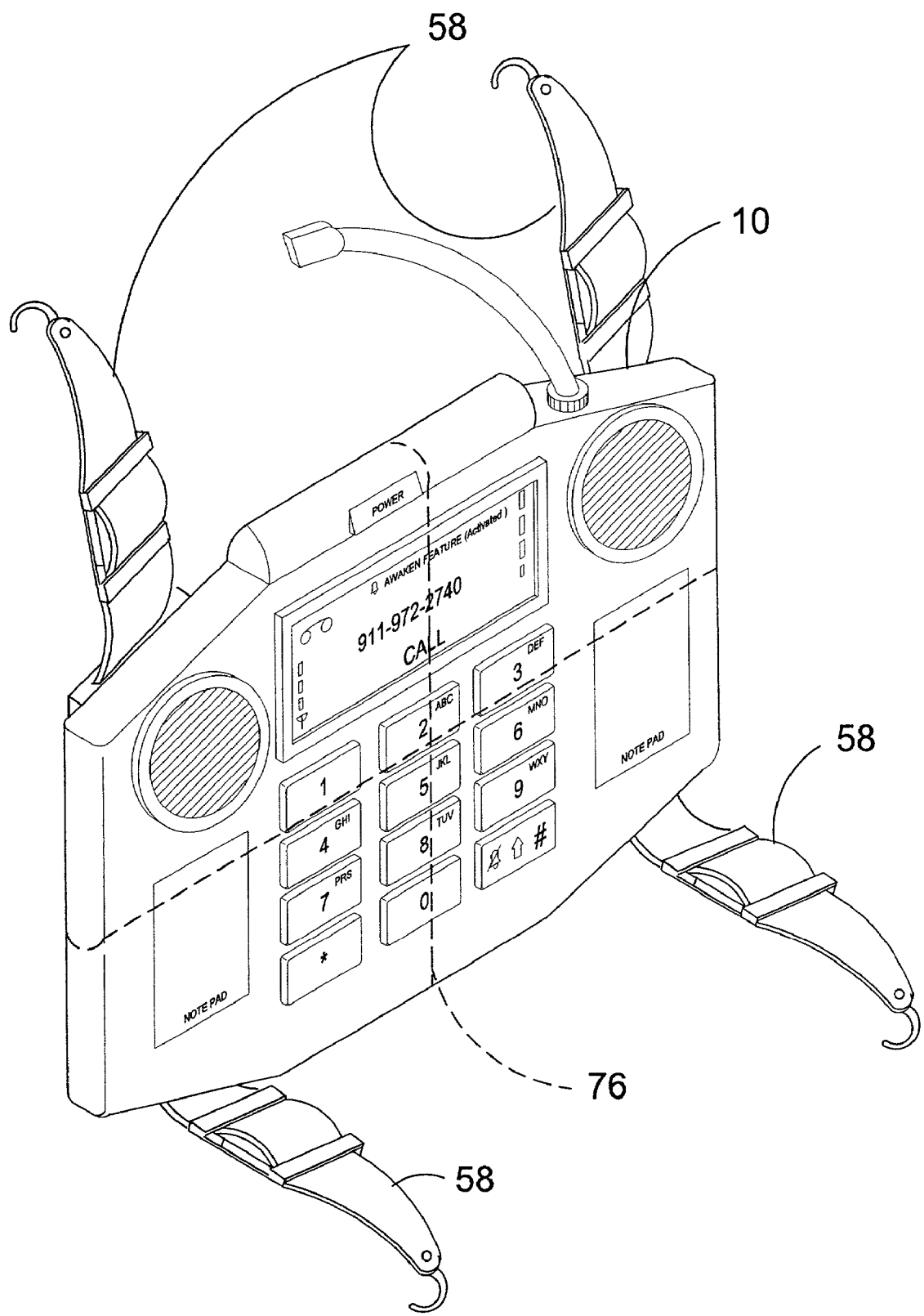
FIG. 15 is a perspective view of the present invention.

Turning to FIG. 15, shown therein is a plurality of breaking points 76 of the cellular phone structure. The breaking points 76 are weakened areas in the phone structure that allow the phone to split into a plurality of sections when forces such as an airbag deployment are applied. Each section has a strap 58 that holds it in place so that when the airbag deployment occurs, all sections of the cellular will remain secured.

Figure 16:
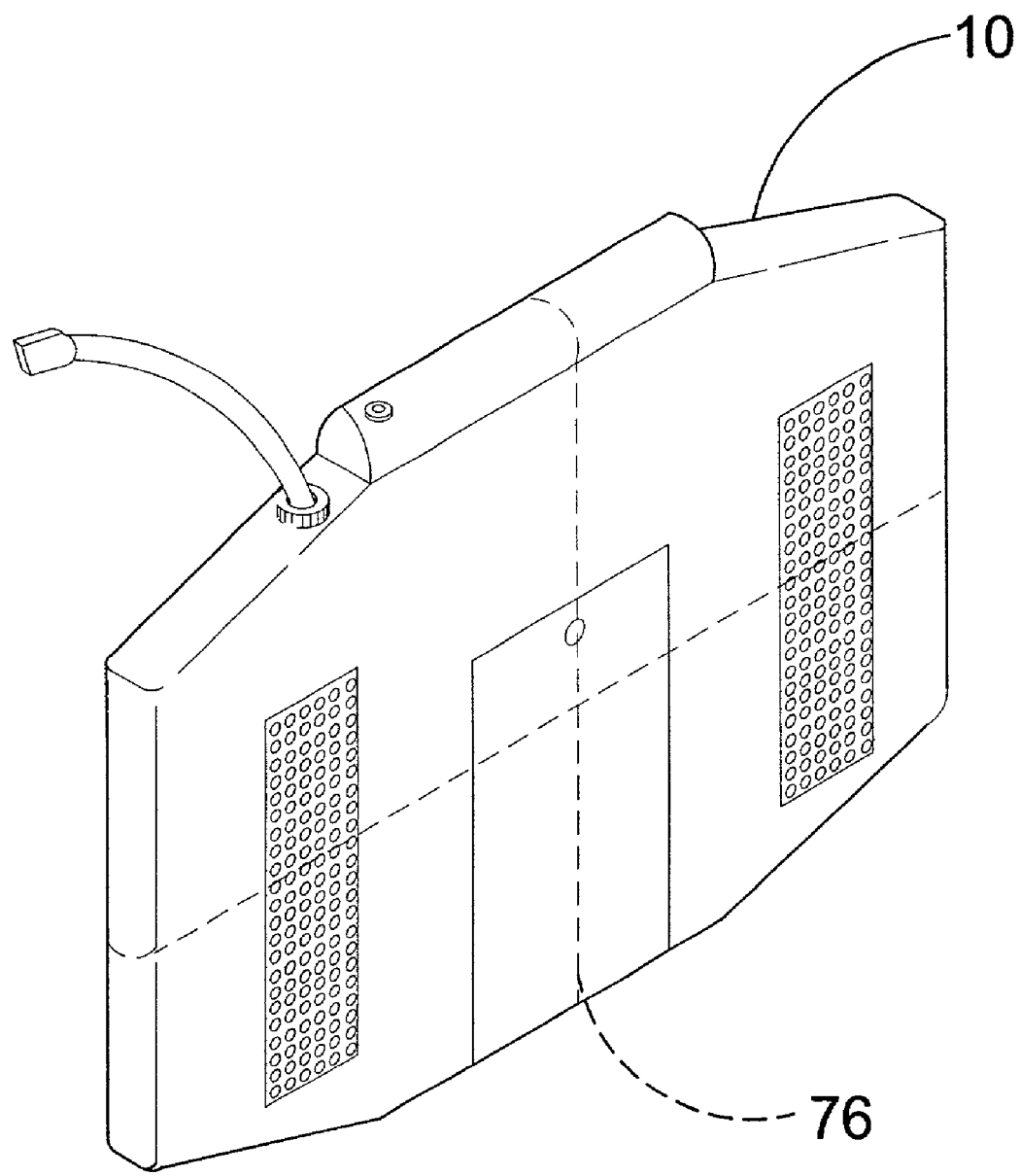
FIG. 16 is a perspective view of the present invention.

Turning to FIG. 16, shown therein a plurality of breaking points 76 on the cellular phone structure. The breaking points 76 are weakened areas in the phone structure that allow the phone to split into a plurality of sections when forces such as would be caused by an airbag deployment are applied.

Figure 17:
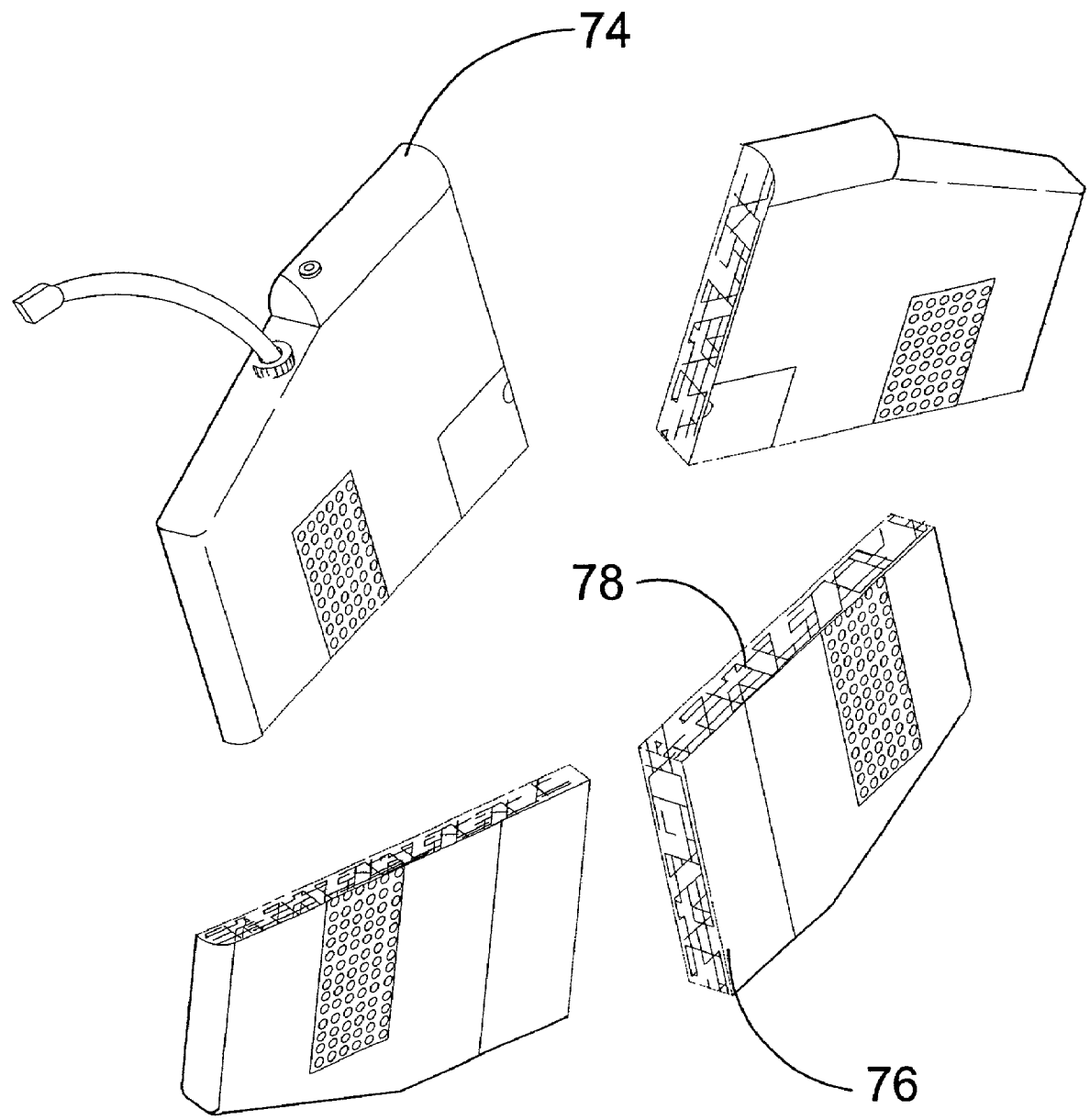
FIG. 17 is perspective view of the cell phone broken up.

Turning to FIG. 17, shown therein is the cell phone of the present invention broken into a plurality of pieces 74 after an airbag force has been applied with the contained electronics also pre-weakened and broken-up into broken electronic pieces 78 according to the approximate breaking points 76 previously disclosed.

Figure 18:
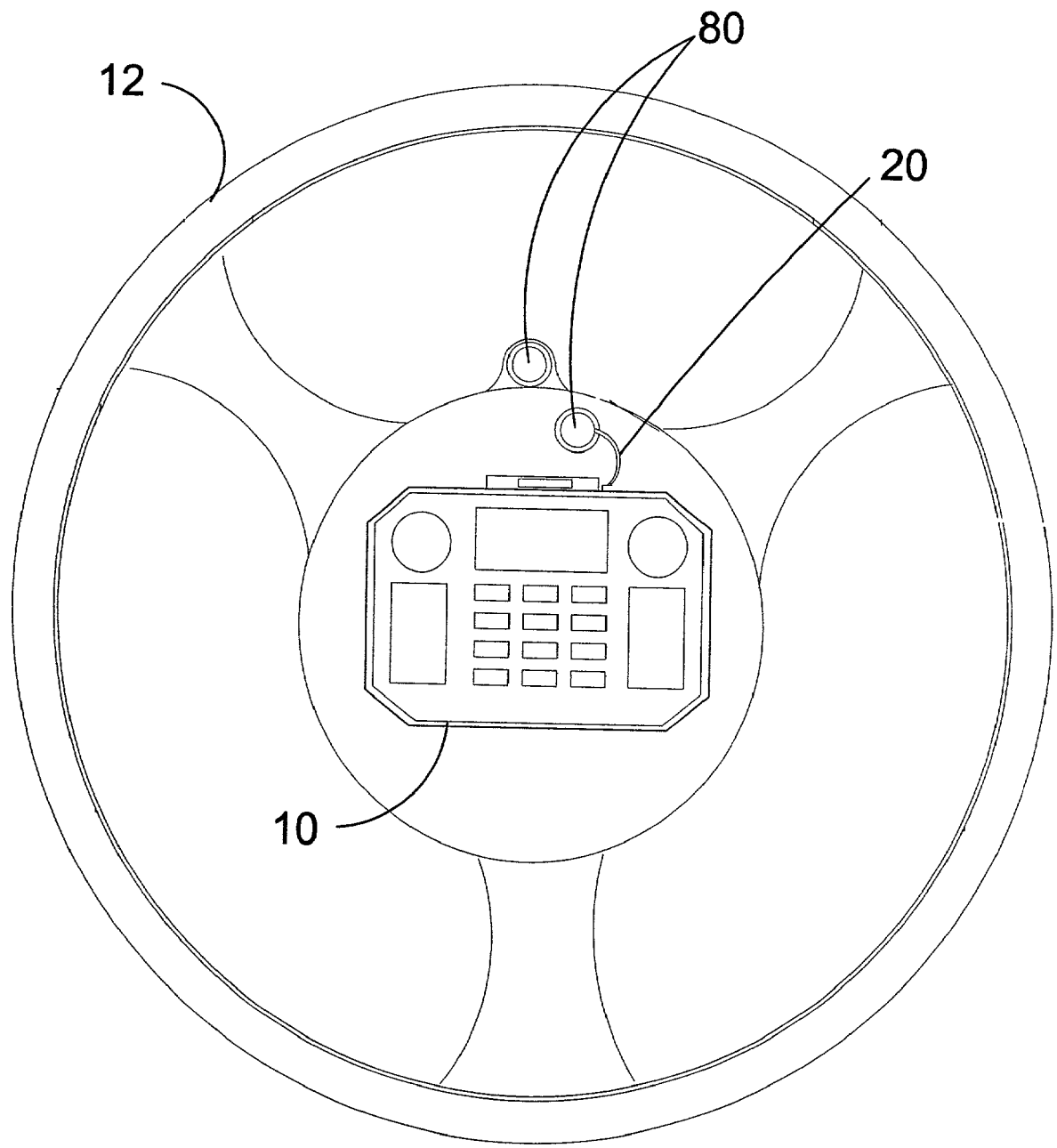
FIG. 18 is a front view of the present invention.

Turning to FIG. 18, shown therein is the present invention 10 having multiple factory installed power outlets 80 to allow for an easier power connection means for the cellular phone recharge wire 20 as well as for receiving connection from an existing phone that might be placed in the cradle 66 (not shown but see FIG. 19) of the present invention for use as a remote interface.

Figure 19:
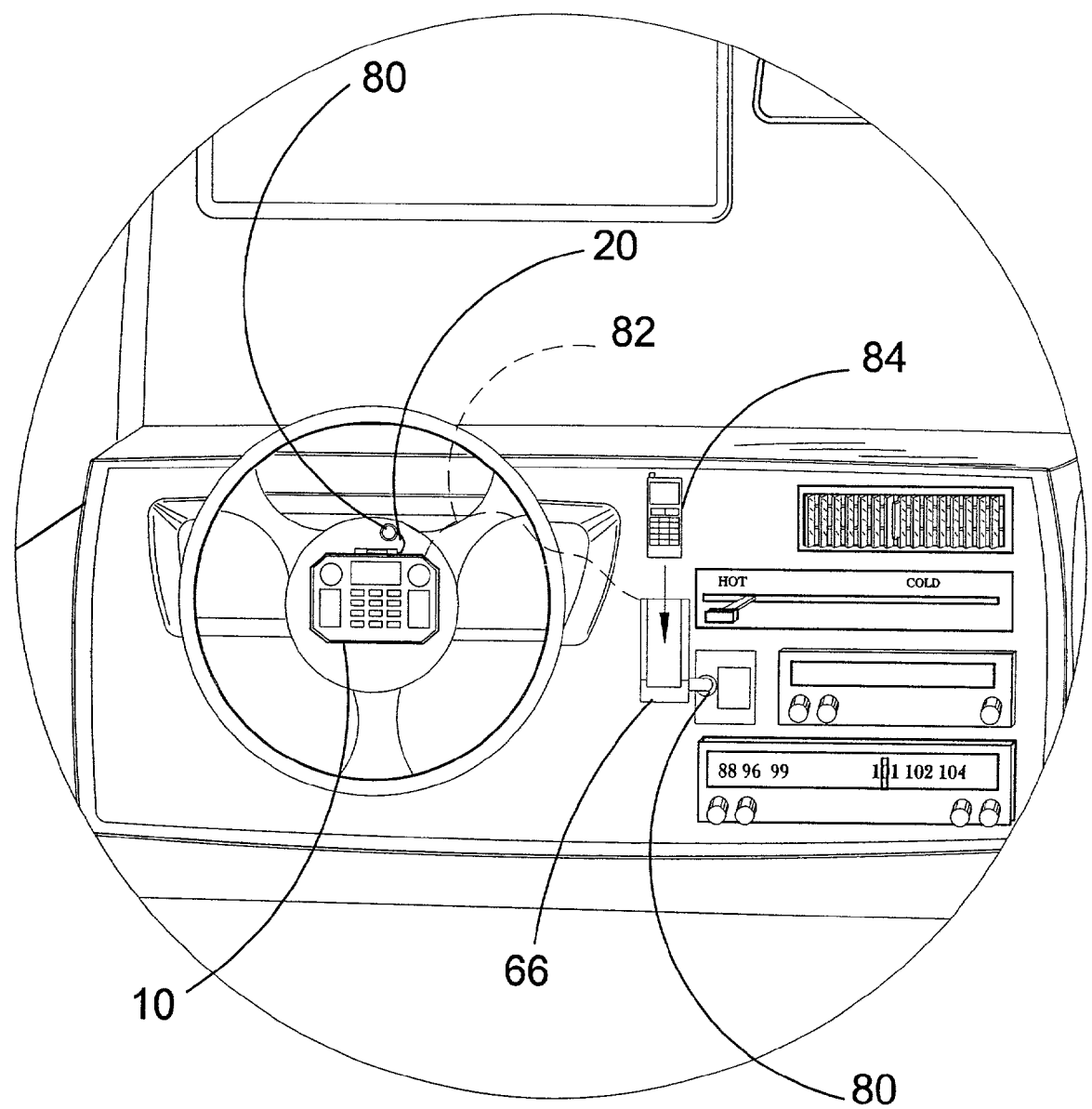
FIG. 19 is a front view of the present invention installed in a car.

Turning to FIG. 19, shown therein is the present invention 10 installed inside of an automobile using an internal connection 82 and also for the connection of the existing phone 84 from the cradle 66 to the present invention for using the present invention as a remote interface (of the existing phone) and factory installed power outlets 80 that eliminate any external wires or connections that may interfere with the user.

By way of summary and a review of the operation of the present invention, the safest place in the entire car for a driver to be able to use a cell phone (to both dial out and receive calls) is on the steering wheel itself, where the hands are never removed from the wheel and eyes are kept on the road with minimal gazing downward to glance at phone display or numbers (equivalent to viewing speedometer or gauges). For years automakers have been installing more controls on or near the steering column for safety reasons. With the advent of the airbag and the sizeable space on its cover, this allows for a perfect location for this phone.

The phone can be manufactured in two ways: (1) In a way that is presented in FIGS. 1–13 due to its mounted position on the airbag face cover, which could cause a potential risk to the driver in the unlikely event of airbag deployment, in the form of injury from propelling pieces or impediment of airbag operation. However, statistically, the safety benefits would far outweigh the risk and the soft casing construction of the device should reduce the probability of serious injury. For those people who have disconnected their airbags, this potential risk obviously is not an issue. The phone device is perfectly safe. (2.) As presented in FIGS. 14–17 where it safely splits up in sections with the tearing up of the airbag cover during deployment, and not be an impediment to the airbag's operation or injurious to the driver.

The phone would be of a nature that can be used to the fullest (dial and receive) and not cause the driver to violate any laws, as this device is truly hands free, and only fingertip operable, and easy to read, and well located, causing the absolute minimum eye distraction from the road, hands never leave the wheel, and a special, passive feature that "awakens" a lethargic driver automatically, after the passage of a short period of driving time sufficient enough to cause a driver to become drowsy (especially in daily commuting traffic, and lack of sleep).

A study has found that approximately 4% of our driving public at any given time, is on the phone. This is a lot of people on the roads, at all speeds, driving potentially dangerously, and in more and more jurisdictions, unlawfully. These numbers will continue to grow, people will not stop using their cell phones in their cars. This invention is intended to make cell phone use in a car the safest possible, and totally lawful, reducing accidents, and keeping the driver awake and mentally "aware."Also, the fact that this new phone can also be used as a remote interface to an existing phone means that your existing phone (most likely is not a "safe-style" phone while driving; i.e., flip phones, or very tiny keypads, etc., and must be held) is rendered useless, when plugged into a cradle, and all the control is now on the remote interface (new phone). So there is no illegal usage, no possibility of you unlawfully grasping hold of your existing cell phone to dial, or gaze down at, etc., your existing "unsafe" cell phone, and yet, one does not have to purchase a separate phone number contract for this new phone.

I claim:

1. An apparatus for a cellular telephone and appurtenances for attachment to an airbag cover of a vehicle steering wheel for use by an operator of the vehicle, comprising:
   a) a housing for containing the cellular telephone, said housing having a front and a back;
   b) means for attaching said housing to the airbag cover;
   c) means for controlling the cellular telephone whereby the operator is able to control and communicate with the cellular telephone; and,
   d) means for supplying power to the cellular telephone whereby the cellular telephone can be operated, wherein said housing further comprises means for multiple weakened breaking lines whereby said housing will break into multiple sections when subjected to a breaking force such as the deployment of an airbag.

2. The apparatus of claim 1, wherein said means for controlling the cellular telephone further comprises means for multiple weakened breaking lines whereby said means for controlling the cellular telephone will break into multiple sections when subjected to a breaking force such as the deployment of an airbag.

3. The apparatus of claim 1, further comprising:
means for an awaken mode disposed on the cellular telephone whereby the cellular telephone automatically calls a previously entered telephone number upon expiration of a previously established period of time.

4. The apparatus of claim 3, wherein said means for an awaken mode is activated when the cellular telephone is turned on and may be cancelled while the call is being made.

5. The apparatus of claim 4, further comprising means for an interface device whereby the cellular telephone assumes control of an independent cellular telephone and forwards all of the functions of an independent cellular telephone to the cellular telephone.

6. The apparatus of claim 5, wherein said means for an interface device further comprises a cradle for receiving an independent cellular telephone.

7. The apparatus of claim 3, wherein said housing is pliable to conform to the shape of the airbag cover.

8. The apparatus of claim 7, wherein said means for attaching said housing to the airbag cover further comprises mating hook and loop material.

9. The apparatus of claim 8, wherein said hook and loop material further comprises a first hook and loop material member disposed on said back of the cellular telephone and a second mating hook and loop material member disposed on the airbag cover.

10. The apparatus of claim 9, wherein said means for attaching said housing to the airbag cover further comprises a strap connector mechanism.

11. The apparatus of claim 10, wherein said strap connector mechanism further comprises a plurality of straps, said straps having a first end and a second end, said second end having a hook thereon, wherein said first end is connected to said housing of the cellular telephone and said hook is connected to the airbag cover.

12. The apparatus of claim 11, wherein said means for controlling the cellular telephone further comprises a microphone, a speaker, a visual display, a keypad, a note pad, multiple control buttons for said note pad, and an earpiece outlet jack.

13. The apparatus of claim 12, wherein said means for supplying power to the cellular telephone further comprises an on/off switch and a cord having a first end and a second end, said first end connected to an input jack on said housing and said second end connected to a retractor means whereby the cord length varies in response to the steering wheel being turned.

14. The apparatus of claim 13, wherein said cord is disposed internal the vehicle.

15. The apparatus of claim 13, further comprising a wire junction disposed on said cord disposed between said input jack and said retractor means to allow said cord to become separated if the airbag is activated.

16. The apparatus of claim 15, further comprising hook and loop material for attaching said cord to a steering column of the vehicle.

17. The apparatus of claim 16, further comprising an elongated tube member for receiving said cord, said tube member being disposed on said retractor means.

18. The apparatus of claim 16, wherein said cord further comprises a vehicle lighter plug adapter for insertion into a lighter plug outlet of the vehicle and a length of coiled cord deposed between said retractor means and the lighter plug outlet.

19. The apparatus of claim 18, further comprising a rechargeable battery power supply.

20. The apparatus of claim 19, further comprising means for a conventional 110-volt AC power supply.

21. The apparatus of claim 20, further comprising a factory installed power outlet for supplying power to the cellular telephone.

* * * * *